(12) United States Patent
Kadono

(10) Patent No.: US 7,400,727 B2
(45) Date of Patent: Jul. 15, 2008

(54) INFORMATION EMBEDDING METHOD, INFORMATION EXTRACTING METHOD, INFORMATION EMBEDDING APPARATUS, INFORMATION EXTRACTING APPARATUS, AND RECORDING MEDIA

(75) Inventor: Shinya Kadono, Kobeshi (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 866 days.

(21) Appl. No.: 09/859,576

(22) Filed: Jun. 15, 2001

(65) Prior Publication Data

US 2001/0052076 A1    Dec. 13, 2001

Related U.S. Application Data

(62) Division of application No. 09/107,457, filed on Jun. 30, 1998, now Pat. No. 6,334,187.

(30) Foreign Application Priority Data

Jul. 3, 1997    (JP)    .................................... 9-178118

(51) Int. Cl.
    *H04N 7/167*    (2006.01)
(52) U.S. Cl. ............... 380/203; 380/201; 380/210; 380/213; 726/26; 726/32; 348/391.1; 348/396.1; 348/473

(58) Field of Classification Search ............... 380/202, 380/54, 267, 201, 203, 210, 213; 713/176; 705/57; 348/391.1, 396.1, 473, 346.1; 726/26, 726/32, 30
    See application file for complete search history.

(56) References Cited

U.S. PATENT DOCUMENTS

| 5,636,292 | A  | * | 6/1997  | Rhoads ..................... 382/232 |
| 5,652,626 | A  |   | 7/1997  | Kawakami et al. .......... 348/463 |
| 5,721,788 | A  |   | 2/1998  | Powell et al. ............... 382/232 |
| 6,002,841 | A  |   | 12/1999 | Tanioka ..................... 395/109 |
| 6,226,387 | B1 | * | 5/2001  | Tewfik et al. ............... 382/100 |
| 7,007,166 | B1 | * | 2/2006  | Moskowitz et al. ......... 713/176 |

FOREIGN PATENT DOCUMENTS

| JP | 5-110971 | 4/1993 |
| JP | 07123244 | 5/1995 |
| JP | 09051425 | 2/1997 |

* cited by examiner

*Primary Examiner*—Matthew Smithers
*Assistant Examiner*—Paul Callahan
(74) *Attorney, Agent, or Firm*—Steptoe & Johnson LLP

(57) ABSTRACT

An apparatus for embedding secret information in an image signal transmitted with a shape signal showing the shape of an object is described. This apparatus comprises an embedding position decision unit for deciding a position in the object where the secret information is to be embedded, according to the shape signal; and a compositor for embedding the secret information in the position decided by the decision unit. Therefore, the secret information is protected against translation or clipping of image.

10 Claims, 24 Drawing Sheets

(4m+0) th frame (4m+1) th frame (4m+2) th frame (4m+3) th frame

Fig.11 (a)

|  | embedding method 1 | embedding method 2 |
|---|---|---|
| duplicable | absent | absent |
| non-duplicable | present | present |

Fig.11 (b)

|  | embedding method 1 | embedding method 2 | display |
|---|---|---|---|
| duplicable | absent | absent | permitted |
| illegal processing | absent | present | inhibited |
| illegal processing | present | absent | inhibited |
| non-duplicable | present | present | permitted | information embedded position information embedded position information embedded position information embedded position amount of embedded
information is large amount of embedded
information is small

INFORMATION EMBEDDING METHOD, INFORMATION EXTRACTING METHOD, INFORMATION EMBEDDING APPARATUS, INFORMATION EXTRACTING APPARATUS, AND RECORDING MEDIA

This is a Divisional of application Ser. No. 09/107,457 filed Jun. 30, 1998, now U.S. Pat. No. 6,334,187.

FIELD OF THE INVENTION

The present invention relates to a method and an apparatus for embedding, i.e., multiplexing, secret information in an image signal for recording or transmission, and a method and an apparatus for extracting the secret information from the image signal. Furthermore, the invention relates to a recording medium containing programs of the information embedding method and the information extracting method.

BACKGROUND OF THE INVENTION

In recent years, we have greeted the age of multimedia in which audio, video, and other data are integrally handled. In parallel with conventional information media, such as newspaper, magazine, television, radio, and telephone, multimedia has been adopted as means for transmitting information to man. Generally, "multimedia" means to show, not only characters, but also diagrams, voices, and especially images, simultaneously, in relation with each other. In order to handle the above-described information media as objects of multimedia, it is necessary to change the information into a digital format.

Generally, digitized information hardly deteriorates although it is repeatedly recorded or transmitted. This is of great advantage to the user, but is not always desirable for the provider of the information. That is, when there is a malicious third party who illegally duplicates the provided information (hereinafter, referred to simply as "third party"), the third party can easily get the same information as the provided one and, therefore, it is difficult for the provider to claim a right to, for example, have a recompense for his/her providing the information.

In order to avoid such illegal duplication, a variety of methods for recording special information (hereinafter, referred to as "secret information") in information to be provided, have been proposed. One of the methods is to add secret information to a header or the like, and this method is used for music CDs or the like. According to this method, however, the secret information is easily altered by the third party.

On the other hand, when secret information is multiplexed into information itself, the third party cannot easily distinguish between the secret information and the original information. In this case, there is a great possibility that the secret information is duplicated while it is protected. When the user, for example, the user of an information decoder, tries to reproduce information, if the information decoder extracts the secret information and detects from the secret information that the information to be reproduced is an illegally duplicated one, the decoder informs the user that this information is an illegal duplication, whereby the user can stop display or output of the information. Adopted as secret information is as follows: information for specifying the author of original information, or information showing the right to duplicate, i.e., whether duplication is permitted or not.

Now, a description is given of the case where the third party illegally gets information in the final stage. Assuming that an image signal is supplied as information, the third party may illegally get the information from the input signal to a display unit. To be specific, since the third party can take the information displayed on the display unit as an electric signal, in order to prevent the secret information from being deleted even in such case, it is desirable that the secret information is multiplexed in the information displayed on the display unit. In this case, it is an indispensable condition that the secret information should be multiplexed so that it does not visually interfere with the displayed information on the display.

FIGS. 21(a)-21(d) are diagrams for explaining an example of a method for multiplexing secret information. FIG. 21(a) shows an image signal to be transmitted or recorded, and FIG. 21(b) shows a specific pattern showing secret information. Initially, this pattern is converted using specific mapping function or spread spectrum to distribute data over a screen. Thereby, the secret information is converted to a signal that does not cause visual interference, as shown in FIG. 21(c). Generally, this conversion is carried out by the spread spectrum method. From the signal shown in FIG. 21(c), it is difficult to analyze what sort of secret information is inserted, like a cipher.

The secret information converted as shown in FIG. 21(c) is added to the image signal shown in FIG. 21(a), whereby FIG. 21(d) is obtained as image information to be transmitted or recorded actually. When the recorded or transmitted image information is regenerated or received, the secret information can be restored by extracting specific data from the image information shown in FIG. 21(d) according to the inverse of the rule on the insertion side.

For example, the image information shown in FIG. 21(d) is subjected to special arithmetic processing, for example, averaging or calculation of correlation coefficients with a specific pattern, to extract the feature of FIG. 21(b), that is, a transverse band in the center of the screen, whereby secret information corresponding to this feature (transverse band) is obtained. Even though the method of extracting the secret information from FIG. 21(d) has already been known, if FIG. 21(a) or FIG. 21(c) is indecipherable from FIG. 21(d), the third party cannot remove the secret information from the image information shown in FIG. 21(d).

Furthermore, when the third party makes such interference with the image information shown in FIG. 21(d) that the secret information cannot be extracted, if the image degradation exceeds a tolerance, the third party cannot obtain an image as shown in FIG. 21(a). In this case, the image information is protected from the intentional interference by the third party.

FIG. 22(a) is a block diagram illustrating a conventional information embedding apparatus. This information embedding apparatus comprises an information converter 12 and a compositor 14. Secret information 10 is input to the information converter 12 while an image signal 11 is input to the compositor 14. The information converter 12 converts the secret information 10 to a pattern corresponding to the secret information as shown in FIG. 21(b) and, further, it converts the pattern to a signal that does not cause visual interference. The compositor 14 multiplexes the converted secret signal 13 in the image signal 11, thereby generating an image signal 15 for recording or transmission.

FIG. 22(b) is a block diagram illustrating a conventional information extracting apparatus. This information extracting apparatus comprises an extractor 20 and an information converter 22. The extractor 20 extracts pattern information 21 relating to the secret signal from the input image signal 15. Receiving the pattern information 21, the information converter 22 converts it to secret information corresponding to the pattern and outputs the secret information.

In the conventional information embedding method described above, however, the secret information is easily destroyed sometimes. FIGS. 23(a)-23(d) are diagrams for explaining the case where the secret information is destroyed. FIG. 23(a) shows an image obtained by subjecting the recorded or transmitted image shown in FIG. 21(d) to parallel translation and clipping, wherein the absolute position of the image including a piano and a trumpet is shifted toward the upper left.

In the conventional information embedding method, since embedding and extraction of secret information are carried out on the basis of the absolute position of image, when the image is parallel-translated as described above, the secret information is detected as a pattern as shown in FIG. 23(b) which is completely different from the pattern shown in FIG. 21(b). For example, when an image is duplicated by an analog device of which precision is not very high, because of disagreement of synchronous signals, the absolute position of the image sometimes shifts toward right or left. In this case, there is a possibility of damaging the secret information even when the user unconsciously operates the device.

Furthermore, the third party can destroy the secret information by making the embedded information shown in FIG. 21(c) undetectable. This is realized by adding an interference signal as shown in FIG. 23(c) to the image. When the absolute position of the embedded information is fixed by the producer of the image, the third party can easily generate such an interference signal.

Furthermore, in the conventional information embedding method, since only one kind of secret information is embedded, it is only detected whether the secret information is recorded or not. From the result of this detection, it cannot be known whether illegal interference is added or not.

SUMMARY OF THE INVENTION

One object of the present invention is to provide a method for embedding secret information in a color image signal, which method can protect the secret information against translation or clipping of image.

Another object of the present invention is to provide a method for extracting secret information embedded by the above-described embedding method, which method can reliably extract the secret information from a reproduced color image signal, and can decide whether illegal interference is added or not.

A further object of the present invention is to provide a method for embedding secret information in an input signal, which can protect the secret information against translation or clipping of image.

Another object of the present invention is to provide a method for extracting secret information from a reproduced signal, which secret information has been embedded by the above-described embedding method.

Still another object of the present invention is to provide a method for embedding secret information in an image signal or an input signal, which method can improve the secrecy of information by varying the secret information embedding position or embedding method.

Yet another object of the present invention is to provide a method for extracting secret information reliably from a reproduced image signal or input signal, which secret information has been embedded by the above-described embedding method.

A still further object of the present invention is to provide a method for embedding secret information in an input signal by different manners, thereby to check the degree of alteration to the secret information.

A yet further object of the present invention is to provide a method for extracting secret information embedded by the above-described embedding method from an input signal, which method can control the method of outputting the input signal according to the degree of alteration or decoding of the secret information.

One object of the present invention is to provide a method and an apparatus for embedding secret information in an image signal (object), which can protect secret information against rotation or scaling (reduction or enlargement) of the image, by embedding the secret information in a specific position of the object.

Another object of the present invention is to provide a method and an apparatus for extracting secret information from a reproduced image signal, which secret information has been embedded by the above-described method and apparatus.

A further object of the present invention is to provide a method and an apparatus for embedding secret information in an image signal (object), which can protect the secret information again rotation of the image, by embedding the secret information in the object along a prescribed direction.

Another object of the present invention is to provide a method and an apparatus for extracting secret information from a reproduced image signal, which secret information has been embedded by the above-described method and apparatus.

Still another object of the present invention is to provide a method and an apparatus for embedding secret information in an image signal (object), which can avoid degradation of image quality, by making the amount to be embedded and the embedding method variable according to the size of the object.

Yet another object of the present invention is to provide a method and an apparatus for extracting secret information from a reproduced image signal, which secret information has been embedded by the above-described method and apparatus.

A further object of the present invention is to provide a method and an apparatus for embedding secret information in an image signal (object), which can protect the secret information against scaling (reduction or enlargement) of the image, by transforming the secret information with a prescribed scale factor according to the size of the object, and embedding the secret information in the object after restoring it to the original size of the object.

A still further object of the present invention is to provide a method and an apparatus for extracting secret information from a reproduced image signal, which secret information has been embedded by the above-described method.

Another object of the present invention is to provide a recording medium in which an information embedding method is recorded, which medium is loaded to an arbitrary computer and enables the computer to execute a process of embedding secret information.

Still another object of the present invention is to provide a recording medium in which an information extracting method is recorded, which medium is loaded to an arbitrary computer and enables the computer to execute a process of extracting secret information.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a method for embedding secret information in a color image signal, and this method comprises the steps of: embedding the secret information in a prescribed position in a first signal component of the color image signal; and embedding position information, which specifies the position where the secret information is embedded, in a second signal component of the color image signal.

According to a second aspect of the present invention, there is provided a method for embedding secret information in a color image signal, and the method comprises the steps of: embedding the secret information in a prescribed position in a luminance signal of the color image signal; and embedding position information, which specifies the position where the secret information is embedded, in a color difference signal of the color image signal.

According to a third aspect of the present invention, there is provided a method for extracting secret information from a color image signal in which the secret information is embedded by an information embedding method according to the first aspect, and the method comprises the steps of: extracting the position information from the second signal component of the color image signal; and, on the basis of the position information extracted, extracting the secret information from the first signal component of the color image signal.

According to a fourth aspect of the present invention, there is provided a method for extracting secret information from a color image signal in which the secret information is embedded by an information embedding method according to the second aspect, and the method comprises the steps of: extracting the position information from the color difference signal of the color image signal; and, on the basis of the position information extracted, extracting the secret information from the luminance signal of the color image signal.

According to a fifth aspect of the present invention, there is provided a method for embedding secret information in an input signal, and the method comprises the steps of: embedding the secret information in a prescribed position in the input signal; and embedding position information, which specifies the position where the secret information is embedded, in another position in the input signal.

According to a sixth aspect of the present invention, there is provided a method for extracting secret information from an input signal in which the secret information is embedded by an information embedding method according to the fifth aspect, and the method comprises the steps of: extracting the position information from the input signal; and, on the basis of the position information extracted, extracting the secret information from the input signal.

According to a seventh aspect of the present invention, there is provided a method for embedding secret information in a prescribed position in an image signal, wherein the position where the secret information is to be embedded is varied frame by frame.

According to an eighth aspect of the present invention, there is provided a method for extracting secret information from an image signal in which the secret information is embedded by an information embedding method according to the seventh aspect, and in this method, when the secret information is extracted from the image signal, the position from which the secret information is extracted is varied frame by frame.

According to a ninth aspect of the present invention, there is provided a method for embedding secret information in an input signal, wherein the secret information is embedded by at least two kinds of methods.

According to a tenth aspect of the present invention, there is provided a method for extracting secret information from an input signal in which the secret information is embedded by an information embedding method according to the ninth embodiment, and the method comprises the steps of: extracting the secret information from the input signal by at least two kinds of methods; and comparing at least two pieces of secret information so extracted with each other, and changing the processing for the secret information according to the result of the comparison.

According to an eleventh aspect of the present invention, there is provided an apparatus for embedding secret information in a color image signal, and the apparatus comprises: first information embedding means for embedding the secret information in a prescribed position in a first signal component of the color image signal; and second information embedding means for embedding position information, which specifies the position where the secret information is embedded, in a second signal component of the color image signal.

According to a twelfth aspect of the present invention, there is provided an apparatus for extracting secret information from a color image signal in which the secret information is embedded by an information embedding apparatus according to the eleventh aspect, and the apparatus comprises: first information extracting means for extracting the position information from the second signal component of the color image signal; and second information extracting means for extracting the secret information from the first signal component of the color image signal, on the basis of the position information provided by the first information extracting means.

According to a thirteenth aspect of the present invention, there is provided an apparatus for embedding secret information in an input signal, and the apparatus comprises: first information embedding means for embedding the secret information in a first position in the input signal; and second information embedding means for embedding position information, which specifies the position where the secret information is embedded, in a second position in the input signal.

According to a fourteenth aspect of the present invention, there is provided an apparatus for extracting secret information from an input signal in which the secret information is embedded by an information embedding apparatus according to the thirteenth aspect, and the apparatus comprises: first information extracting means for extracting the position information showing the first position, from the input signal; and second information extracting means for extracting the secret information from the input signal, on the basis of the position information provided by the first information extracting means.

According to a fifteenth aspect of the present invention, there is provided an apparatus for embedding secret information in an input signal, which apparatus comprises a plurality of information embedding means for embedding the secret information by different methods.

According to a sixteenth aspect of the present invention, there is provided an apparatus for extracting secret information from an input signal in which the secret information is embedded by an information embedding apparatus according to the fifteenth aspect, and the apparatus comprises: a plurality of information extracting means for extracting, from the input signal, plural pieces of secret information which have been embedded by the respective methods; and information decision means for comparing the contents of the plural pieces of secret information respectively extracted by the plural information extracting means, and changing processing for the input signal according to the result of the comparison.

According to a seventeenth aspect of the present invention, there is provided a method for embedding secret information in an image signal transmitted with information showing the shape of an object, and the method comprises the step of embedding the secret information in a prescribed position in the object, which position is specified by the information showing the shape of the object.

According to an eighteenth aspect of the present invention, there is provided a method for extracting secret information from an image signal in which the secret information is embedded by an information embedding method according to the seventeenth aspect, and the method comprises the steps of: extracting position information for specifying the position where the secret information is embedded, from the information showing the shape of the object; and, on the basis of the extracted position information, extracting the embedded secret information from the prescribed position in the object.

According to a nineteenth aspect of the present invention, there is provided a method for embedding secret information in an image signal transmitted with information showing the shape of an object, and the method comprises the step of embedding the secret information in a prescribed direction with respect to the shape of the object specified by the information showing the shape of the object.

According to a twentieth aspect of the present invention, there is provided a method for extracting secret information from an image signal in which the secret information is embedded by an information embedding method according to the nineteenth aspect, the method comprises the steps of: extracting direction information, which specifies the direction along which the secret information is embedded in the object, from the information showing the shape of the object; and extracting the secret information from the object, on the basis of the extracted direction information.

According to a twenty-first aspect of the present invention, there is provided a method for embedding secret information in an image signal transmitted with information showing the shape of an object, and the method comprises the step of embedding the secret information after changing the amount of secret information to be embedded in the image signal according to the size of the object specified by the information showing the shape of the object, and changing the method of embedding the secret information according to the amount of secret information to be embedded.

According to a twenty-second aspect of the present invention, in a method for embedding secret information according to the twenty-first aspect, the method for embedding secret information is changed by changing the cycle of pseudo random numbers when the secret information is embedded.

According to a twenty-third aspect of the present invention, there is provided a method for extracting secret information from an image signal in which the secret information is embedded by an information embedding method according to the twenty-first aspect, and the method comprises the steps of: extracting amount information, which shows the amount of the secret information embedded, from the information showing the shape of the object; and extracting the secret information after deciding the amount of the secret information embedded in the object and the embedding method employed, according to the amount information.

According to a twenty-fourth aspect of the present invention, there is provided a method for embedding secret information in an image signal transmitted with information showing the shape of an object, and the method comprises the steps of: extracting size information showing the size of the object from the information showing the shape of the object; forming a secret information write region, which corresponds to a shape obtained by reducing or enlarging the size of the object to a prescribed size, according to the size information; writing the secret information in this region; and embedding the secret information in the image signal after restoring the secret information write region to its original size.

According to a twenty-fifth aspect of the present invention, there is provided a method for extracting secret information from an image signal in which the secret information is embedded by an information embedding method according to the twenty-fourth aspect, and the method comprises the steps of: detecting the size of the object in which the secret information is embedded, from the information showing the shape of the object; and extracting the secret information from the object, after enlarging or reducing the detected object size to the size when the secret information is written.

According to a twenty-sixth aspect of the present invention, there is provided an apparatus for embedding secret information in an image signal transmitted with information showing the shape of an object, and the method comprises the steps of: embedding position deciding means for deciding a position in the object where the secret information is to be embedded, with reference to the information showing the shape of the object; and composition means for embedding the secret information in the position decided by the position deciding means.

According to a twenty-seventh aspect of the present invention, there is provided an apparatus for extracting secret information from an image signal in which the secret information is embedded by an information embedding apparatus according to the twenty-sixth aspect, and the apparatus comprises: embedding position deciding means for detecting a position in the object where the secret information is embedded, with reference to the information showing the shape of the object; and extraction means for extracting the secret information from the position decided by the embedding position deciding means.

According to a twenty-eighth aspect of the present invention, there is provided an apparatus for embedding secret information in an image signal transmitted with information showing the shape of an object, and the apparatus comprises: embedding direction deciding means for deciding a direction along which the secret information is to be embedded in the object, with reference to the information showing the shape of the object; and composition means for embedding the secret information along the direction decided by the direction deciding means.

According to a twenty-ninth aspect of the present invention, there is provided an apparatus for extracting secret information from an image signal in which the secret information is embedded by an information embedding apparatus according to the twenty-eighth aspect, and the apparatus comprises: embedding direction deciding means for deciding a direction along which the secret information has been embedded in the object, with reference to the information showing the shape of the object; and extraction means for extracting the secret information from the object along the direction decided by the direction deciding means.

According to a thirtieth aspect of the present invention, there is provided an apparatus for embedding secret information in an image signal transmitted with information showing the shape of an object, and the apparatus comprises: object size detecting means for detecting the size of the object from the information showing the shape of the object; embedding amount deciding means for deciding an amount of secret information to be embedded in the object according to the result of the detection, and deciding a method for embedding secret information according to the decided amount of secret information; and composition means for embedding the secret information in the object, by the amount decided in the amount deciding means, according to the decided method.

According to a thirty-first aspect of the present invention, in the apparatus for embedding secret information according to the thirtieth aspect, the method for embedding secret information is changed by changing the cycle of pseudo random numbers when the secret information is embedded.

According to a thirty-second aspect of the present invention, there is provided an apparatus for extracting secret information from an image signal in which the secret information is embedded by an information embedding apparatus according to the thirtieth aspect, and the apparatus comprises: object size detecting means for detecting the size of the object from the information showing the shape of the object; embedding amount deciding means for deciding the amount of secret information embedded in the object, with reference to the result of the detection by the object size detecting means; and extraction means for extracting secret information from the object, by the amount decided in the embedding amount deciding means.

According to a thirty-third aspect of the present invention, there is provided an apparatus for embedding secret information in an image signal transmitted with information showing the shape of an object, and the apparatus comprises: object size detecting means for detecting the size of the object from the information showing the size of the object; first secret information transforming means for forming a secret information write region, which corresponds to a shape obtained by reducing or enlarging the size of the object to a prescribed size, with reference to the result of the detection by the object size detecting means; second secret information transforming means for expanding or compressing the secret information write region, thereby to restore the region to its size before the reduction or enlargement; and composition means for embedding the secret information, which is converted by the second secret information converting means, in the object.

According to a thirty-fourth aspect of the present invention, there is provided an apparatus for extracting secret information from an image signal in which the secret information is embedded by an information embedding apparatus according to the thirty-third aspect, and the apparatus comprises: object size detecting means for detecting the size of the object, from the information showing the shape of the object; object transforming means for enlarging or reducing the size of the object to a prescribed size, with reference to the result of the detection by the object size detecting means; and extraction means for extracting the secret information from the object transformed by the object transforming means.

According to a thirty-fifth aspect of the present invention, there is provided a computer-readable medium in which a program for executing any of the above-described information embedding methods is recorded.

According to a thirty-sixth aspect of the present invention, there is provided a computer-readable medium in which a program for executing any of the above-described information extracting methods is recorded.

BRIEF DESCRIPTION OF THE DRAWINGS

FIGS. 11(a) and 11(b) are diagrams for explaining examples of decision of secret information according to the fourth embodiment.

DETAILED DESCRIPTION OF THE PREFERRED EMBODIMENTS

Embodiment 1

Figure 1:
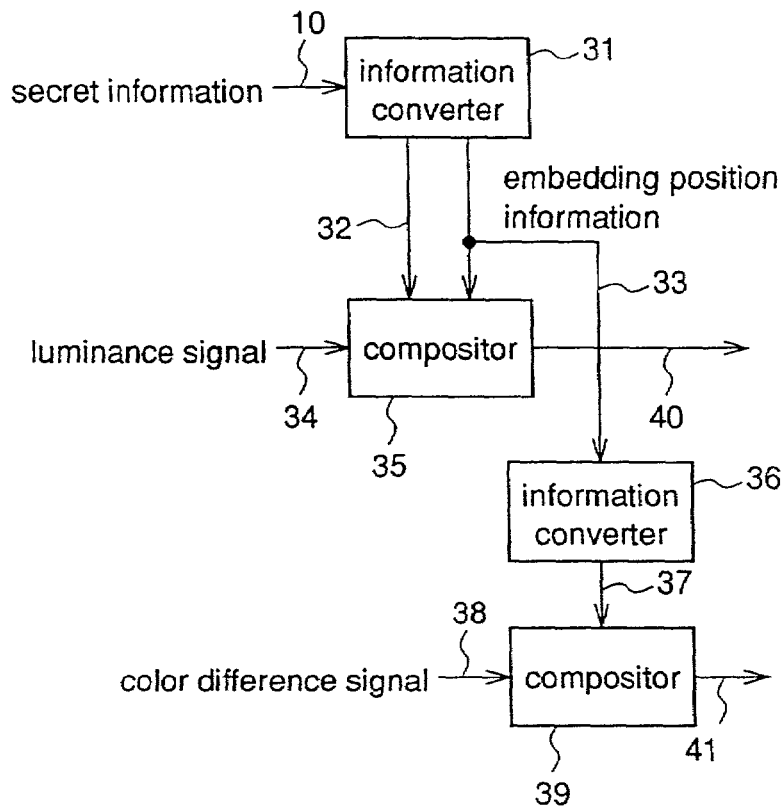
FIGS. 1(a) and 1(b) are block diagrams illustrating an information embedding apparatus and an information extracting apparatus, respectively, according to a first embodiment of the invention.
Figure 1:
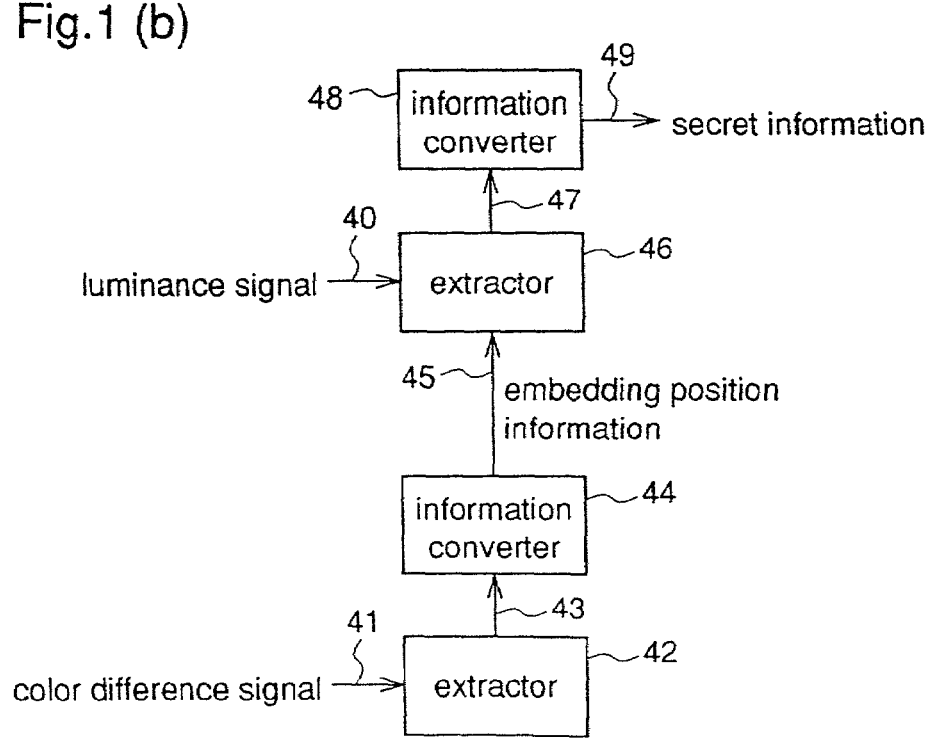

Hereinafter, a description is given of an information embedding method and an information extracting method according to a first embodiment of the present invention. Usually, an image signal is a color signal composed of a luminance signal and a color difference signal. Since the luminance signal is visually more important than the color difference signal, these signals are usually coded by different methods, and the method employed for coding the luminance signal causes less distortion and less degradation of image quality than the method employed for coding the color difference signal. The coded signals are recorded or transmitted. With respect to the color signal, since the luminance signal and the color difference signal are processed together, the relative positions of the luminance signal and the color difference signal do not change within a screen when the color signal is recorded or transmitted. The same may be said of a component signal or a signal that is compressively coded by DCT or the like.

Furthermore, when the pixel position of the luminance signal does not match the pixel position of the color difference signal, the image quality degrades considerably and, therefore, it is unthinkable that the correspondence of the pixel positions between the luminance signal and the color difference signal is changed. So, in this first embodiment, secret information is embedded in the luminance signal, and information relating to the position where the secret information is embedded (hereinafter, referred to as embedding position information) is recorded in the color different signal, thereby realizing an information embedding method in which the embedded secret information is hardly destroyed in parallel translation of image. The following methods are employed for embedding secret information in the luminance signal and the color difference signal.

(1) For the luminance signal, employed is an information embedding method that is a little resistless to interference due to parallel translation, but is resistant to other interference.

(2) For the color difference signal, employed is an information embedding method that is resistant to interference due to parallel-translation, but is a little resistless to other interference.

With respect to unconscious (non-illegal) interference due to parallel-translation, the embedding position information can be detected from the color difference signal. In this case, the secret information can be correctly extracted from the luminance signal. When the embedding position information cannot be detected from the color difference signal because of illegal interference, since it is decided that illegal processing is carried out, this decision may be posted to the apparatus. Further, when the embedding position information cannot be detected from the color difference signal, the secret information may be extracted from the luminance signal by the conventional information extracting method, without referring to the color difference signal.

A description is now given of a secret information embedding method using pseudo random numbers (PN sequences). An M sequence, which is one of PN sequences, is a linear code having a maximum cycle among linear codes constructed by shift registers of the same degree. The M sequence is used most often as pseudo random numbers. For example, a generating polynomial shown in formula (1) is considered.

$$G1 = \begin{bmatrix} 1 & 0 & 1 & 1 & 1 & 0 & 0 \\ 0 & 1 & 0 & 1 & 1 & 1 & 0 \\ 0 & 0 & 1 & 0 & 1 & 1 & 1 \end{bmatrix} \quad (1)$$

The following seven sequences are generated by the polynomial G1.

(0,0,1,0,1,1,1)
(0,1,0,1,1,1,0)
(1,0,1,1,1,0,0)
(0,1,1,1,0,0,1)
(1,1,1,0,0,1,0)
(1,1,0,0,1,0,1)
(1,0,0,1,0,1,1)

The M sequence is excellent as pseudo noise because, in the M sequence, the normal frequency of 1 is approximately equal to that of 0, its characteristic is akin to random noise, and its auto-correlation has a very high peak value. The M sequence is expressed by formula (2).

$$G2 = \begin{bmatrix} 1 & 1 & 1 & 0 & 1 & 0 & 0 \\ 0 & 1 & 1 & 1 & 0 & 1 & 0 \\ 0 & 0 & 1 & 1 & 1 & 0 & 1 \end{bmatrix} \quad (2)$$

The following seven sequences are generated by the polynomial G2.

(0,0,1,1,1,0,1)
(0,1,1,1,0,1,0)
(1,1,1,0,1,0,0)
(1,1,0,1,0,0,1)
(1,0,1,0,0,1,1)
(0,1,0,0,1,1,1)
(1,0,0,0,1,1,0)

Since G1 and G2 are different kinds of pseudo noises, the auto-correlation increases only when the corresponding sequences match. It is also possible to extract one of G1 and G2 from the state where both of G1 and G2 coexist, i.e., where both of them are embedded as secret information.

Now, an image signal is divided into plural blocks each having N pixel values $\{x1, x2, x3, \ldots xN\}$.

Then, pseudo random numbers (pseudo noise) having length N, $\{P1, P2, P3, \ldots PN\}$, are added to the image signal, thereby providing $\{x1+P1, x2+P2, x3+P3, \ldots xN+PN\}$ as a block of pixel values wherein secret information is embedded.

This operation is performed for each block of the input image signal, providing an image signal in which secret information is embedded.

From the image signal so constructed, the secret information is extracted in the following manner.

Initially, the image signal is divided into blocks to obtain {x1+P1, x2+P2, x3+P3, ... xN+PN}.

Then, for each of the N components of all the blocks, the average is calculated as follows:

$$\{E(x1+P1), E(x2+P2), E(x3+P3), \ldots E(xN+PN)\} = \{E(x1)+P1, E(x2)+P2, E(x3)+P3, \ldots E(xN)+PN\}$$

wherein $E(x)$ is the average of x.

Assuming that $\{xi\}$ shows pixel values and the average over the entire image is m, since $E\{xi\}=m+\delta i$, the above equation becomes $$\{E(x1+P1), E(x2+P2), E(x3+P3), \ldots E(xN+PN)\} = \{m+\delta1+P1, m+\delta2+P2, m+\delta3+P3, \ldots m+\delta N+PN\}$$

wherein $\{\delta i\}$ is a difference between $E\{xi\}$ and m, and this value is approximately 0.

Accordingly, when m is subtracted from each component described above, and the correlation between R={δ1+P1, δ2+P2, δ3+P3, ... δN+PN} and the pseudo random numbers {P1, P2, P3, PN} is calculated, since the auto-correlation is large, it is detected that the pseudo random numbers {P1, P2, P3, ... PN} are embedded. If the pseudo random numbers {P1, P2, P3, ... PN} are not embedded, since R={δ1, δ2, δ3, ... δN}, the correlation between R={δ1, δ2, δ3, ... δN} and the pseudo random numbers {P1, P2, P3, ... PN} is small. In this case, it is decided that the pseudo random numbers {P1, P2, P3, ... PN} are not embedded.

Figure 24:
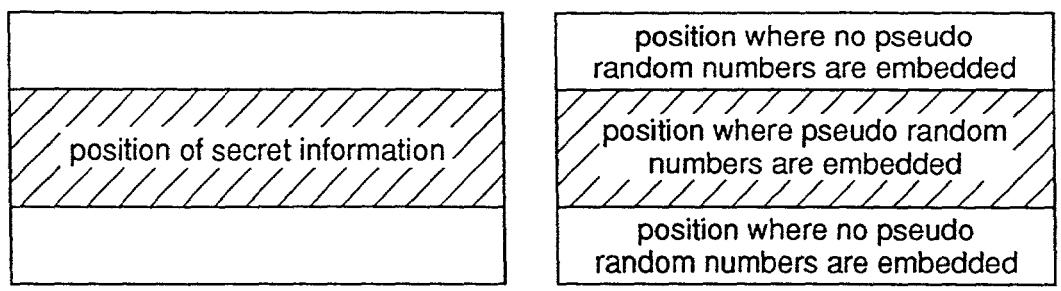
FIG. 24 is a diagram for explaining an example of a position where pseudo random numbers are embedded.

A description is now given of the case where secret information is embedded in a position in the luminance signal shown in FIG. 24. In this case, pseudo random numbers are superposed on a position in the color difference signal corresponding to the position where the secret information is embedded. To be specific, each scanning line of the color difference signal is divided into plural blocks each having N pixels and, when this block corresponds to the secret information embedding position in the luminance signal, the pseudo random numbers of length N are superposed on the pixel values of this block. When this block is outside the secret information embedded region of the luminance signal, the pseudo random numbers are not superposed. As the result, it can be detected, by a secret information extractor which is described later, that the secret information is embedded correspondingly to the scanning lines including the pseudo random numbers.

When data of large auto-collection are selected as pseudo random numbers of length N, the secret information embedding position can be limited in the vertical direction as well. For example, N pseudo random numbers are selected such that the correlation between {P1, P2, P3, ... PN} and {P1+$M_{modN}$, P2+$M_{modN}$, P3+$M_{modN}$, ... PN+$M_{modN}$} attains the maximum when M=0 and decreases when M=1, 2, 3, ... N−1. In this case, when the embedded information is detected, if the partitioning position for creating blocks of N pixels is different from that at the embedding of the information, the correlation is decreased.

Figure 25:
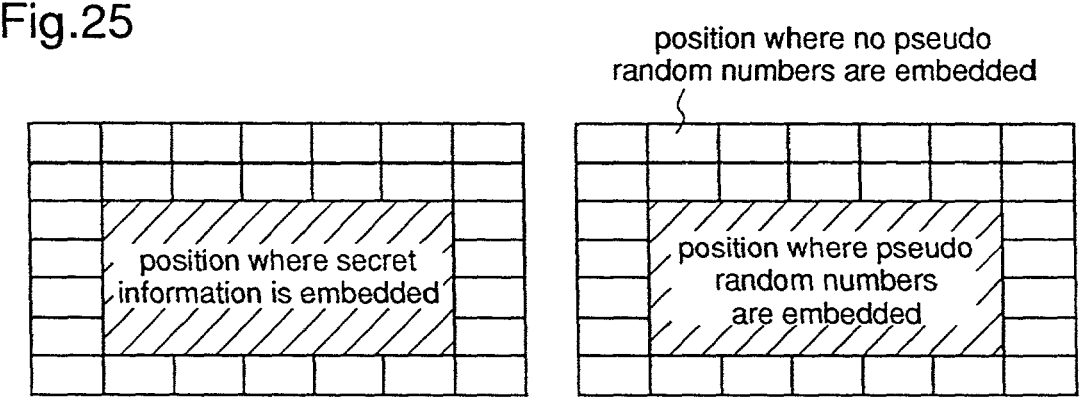
FIG. 25 is a diagram for explaining another example of a position where pseudo random numbers are embedded.

Accordingly, several kinds of partitioning positions for blocking are tried, and one of them, which offers the maximum correlation, is selected as a partitioning position for blocking. Further, as shown in FIG. 25, a rectangle area can be specified by superposing pseudo noise on only blocks in specific horizontal scanning position in specific scanning lines.

Hereinafter, an information embedding apparatus according to the first embodiment of the invention will be described using a block diagram of FIG. 1(a). This information embedding apparatus comprises a first information converter 31, a first compositor 35, a second information converter 36, and a second compositor 39. Secret information 10 is input to the information converter 31, and a luminance signal 34 is input to the compositor 35. Further, a color difference signal 38 is input to the compositor 39.

Figure 21:
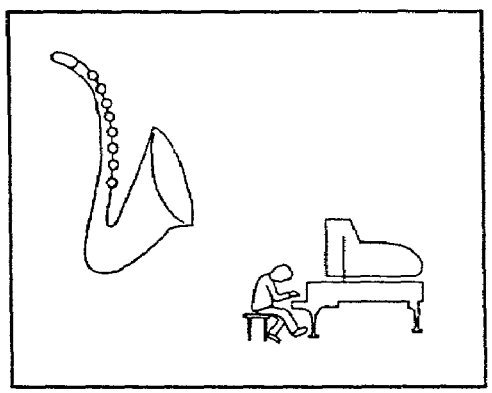
FIGS. 21(a)-21(d) are diagrams for explaining an example of multiplexing of secret information.
Figure 21:
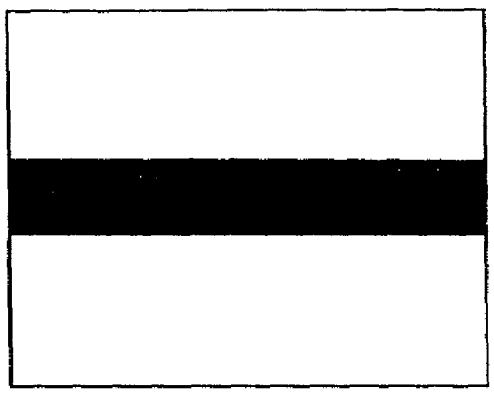
Figure 21:
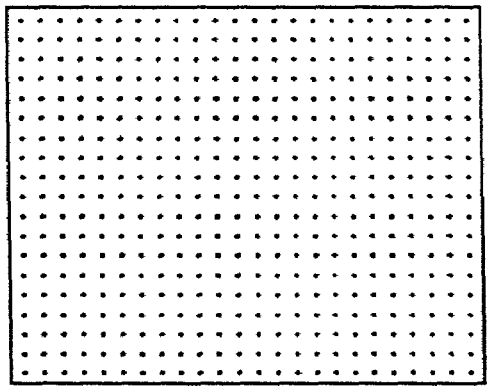
Figure 21:
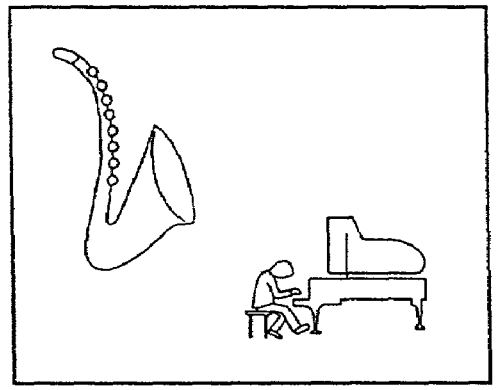
Figure 22:
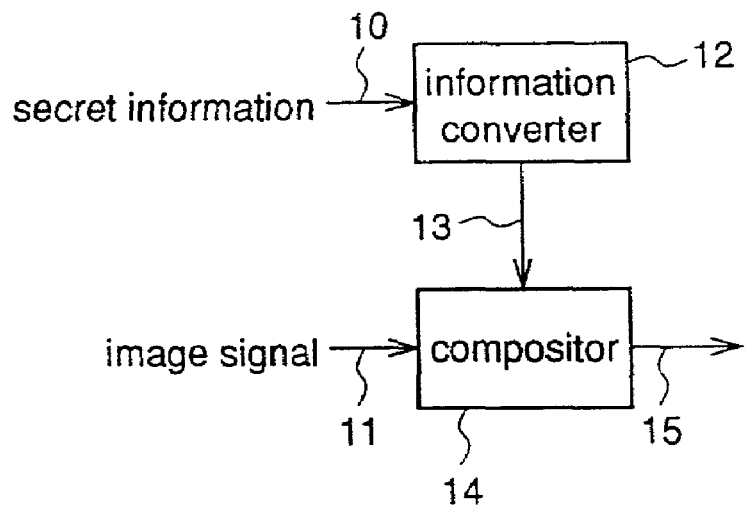
FIGS. 22(a) and 22(b) are block diagrams illustrating an information embedding apparatus and an information extracting apparatus, respectively, according to the prior art.
Figure 22:
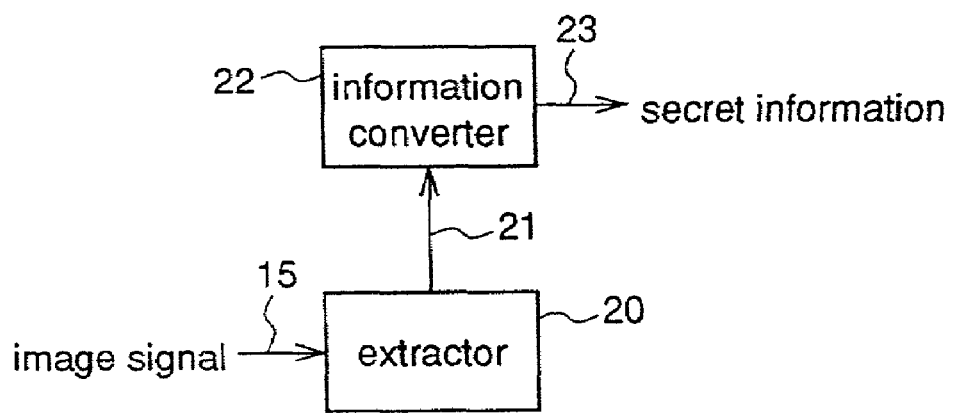
Figure 23:
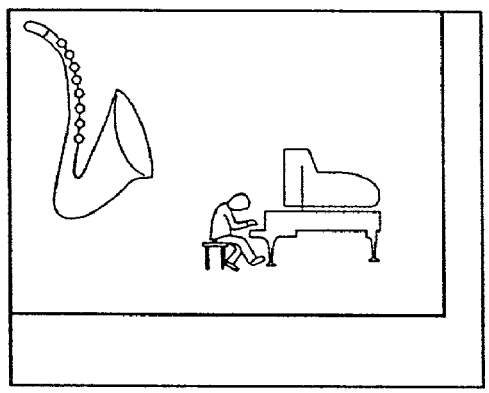
FIGS. 23(a)-23(d) are diagrams for explaining the case where secret information is destroyed.
Figure 23:
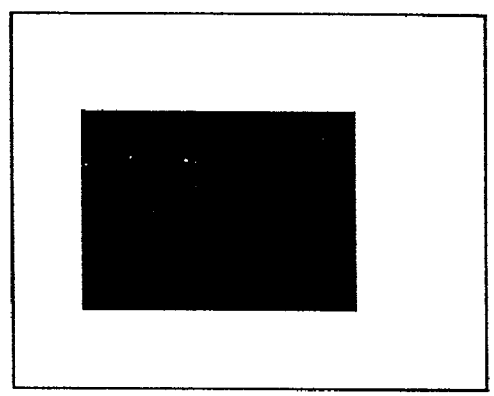
Figure 23:
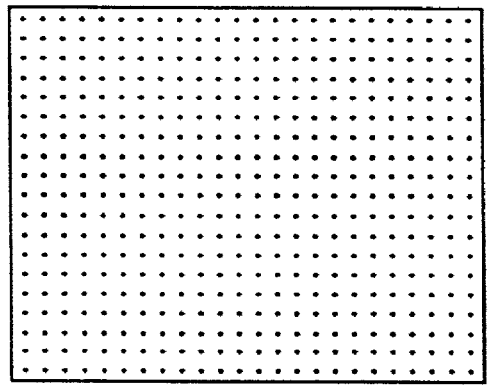
Figure 23:
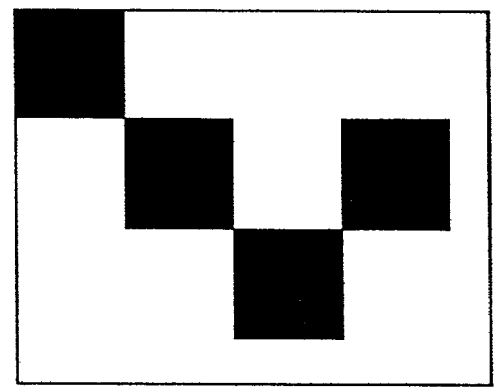

The information converter 31 converts the input secret information 10 to a specific pattern as shown in FIG. 21(b), and converts the pattern to a secret signal 32 which does not cause visual interference as shown in FIG. 21(c). The information converter 31 outputs the secret signal 32 toward the compositor 35, and outputs information 33 showing a position where the secret signal 32 is to be embedded (embedding position information) toward the information converter 36.

The compositor 35 multiplexes the secret signal 32 in the luminance signal 34 at the position indicated by the embedding position information 33, and outputs an image signal (luminance signal) for recording or transmission. Further, the information converter 36 converts the embedding position information 33 into a secret signal 37, and outputs this toward the compositor 39. The compositor 39 multiplexes the secret signal 37 into the color difference signal 38, and outputs an image signal (color difference signal) 41 for recording or transmission.

A description is now given of an information extracting apparatus according to the first embodiment. FIG. 1(b) is a block diagram illustrating the information extracting apparatus. The information extracting apparatus comprises a first extractor 42, a first information converter 44, a second extractor 46, and a second information converter 48.

The extractor 42 receives the color difference signal 41, extracts a secret signal 43 from the color difference signal 41, and outputs it toward the information converter 44. The information converter 44 converts the secret signal 43 to embedding position information 45, and outputs it toward the extractor 46. The extractor 46 extracts pattern information 47 from a position in the luminance signal 40 specified by the embedding position information 45. The information converter 48 converts the pattern information 47 to secret information 49 to be output.

Figure 2:
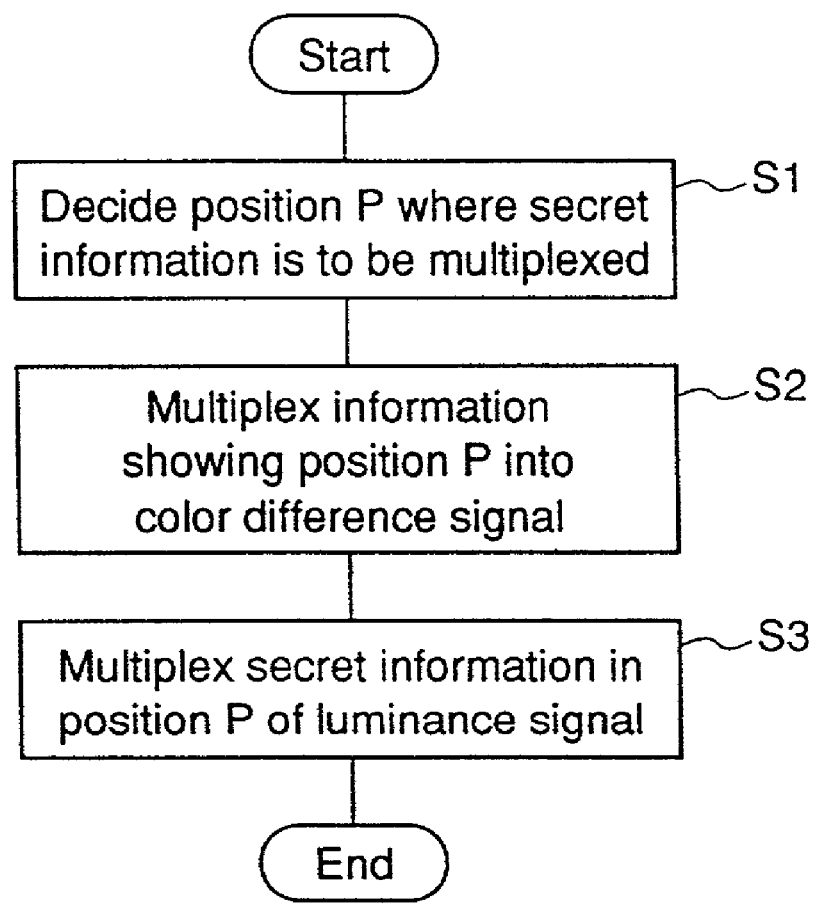
FIG. 2 is a flowchart showing an information embedding method according to the first embodiment.

FIG. 2 is a flowchart showing an information embedding method according to the first embodiment. Initially, in step S1, a position P of the luminance signal, wherein secret information is to be embedded (multiplexed), is decided. Next, in step S2, information showing the position P is converted to a signal which does not cause visual interference, and this signal is embedded (multiplexed) in the color difference signal. In step 3, the input secret information is converted to a signal which does not cause visual interference, and this signal is embedded (multiplexed) in the position P of the luminance signal decided in step S1. The process in step S2 and the process in step S3 may be inverted.

Figure 3:
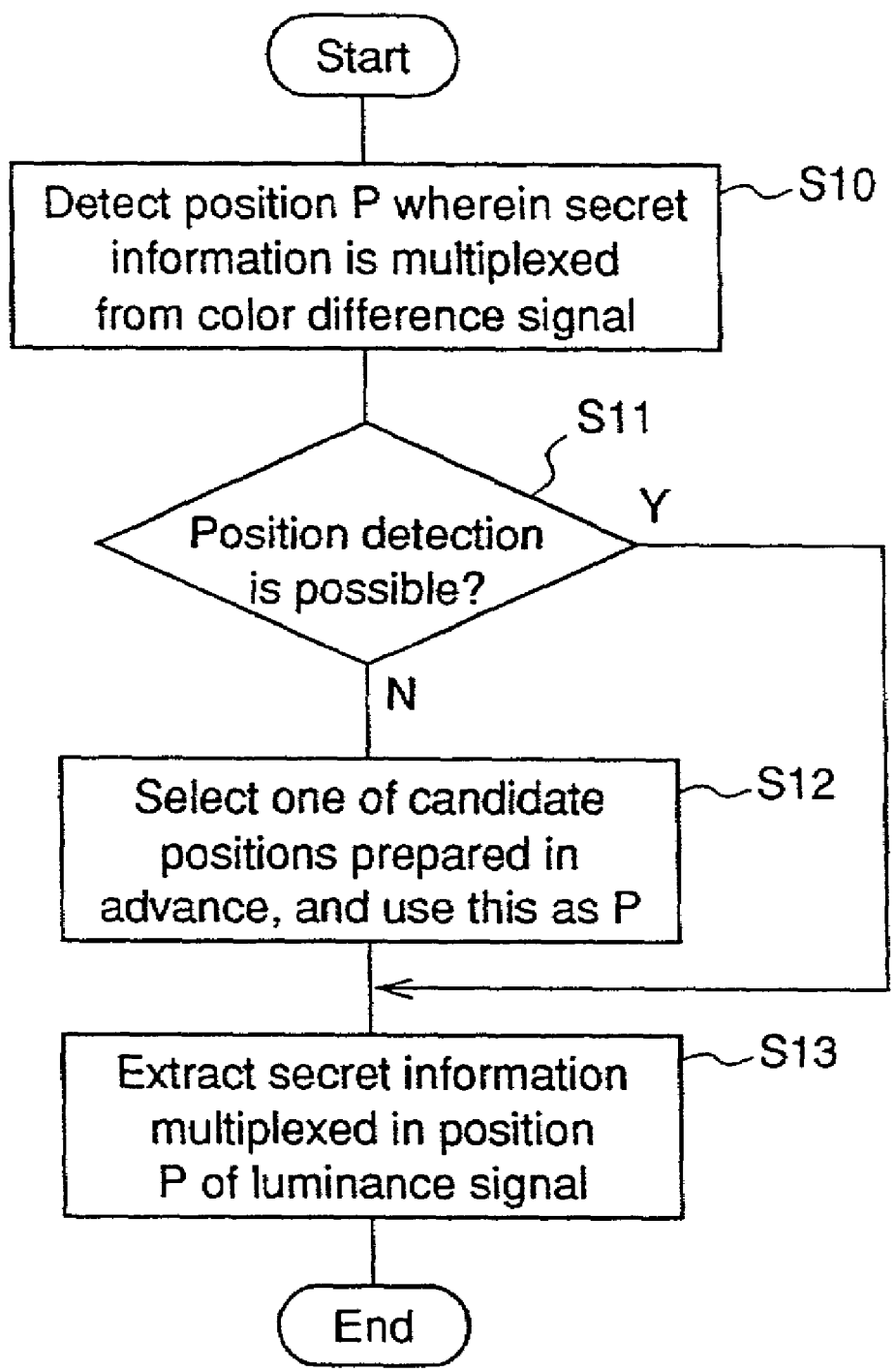
FIG. 3 is a flowchart showing an information extracting method according to the first embodiment.

FIG. 3 is a flowchart showing an information extracting method according to the first embodiment. Initially, in step S10, embedding position information is extracted from the color difference signal, and a position in the luminance signal where secret information is embedded is detected. In step S11, it is decided whether or not the position in the luminance signal where the secret information is embedded is detected in step S10. When the position is not detected, the operation proceeds to step S12 wherein one of candidate positions prepared in advance is selected by a prescribed method, as a position in the luminance signal wherein the secret information is embedded. In step S13, the secret information is extracted from the luminance signal shown by the embedding position information. When the position of the secret information embedded in the luminance signal cannot be decoded from the color difference signal, it is decided that illegal processing has been carried out, followed by a countermeasure to the illegal processing.

Embodiment 2

Figure 7:
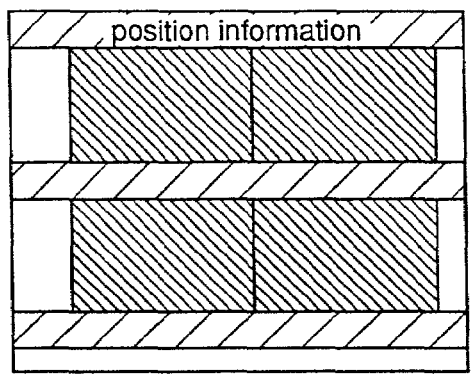
FIG. 7(a) is a diagram for explaining a first method of multiplexing position information and secret information.
FIG. 7(b) is a diagram for explaining a second method of multiplexing position information and secret information.
FIG. 7(c) is a diagram for explaining a method of changing the secret information embedding position.
Figure 7:
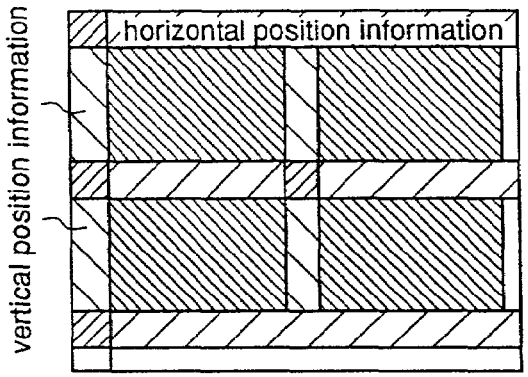
Figure 7:
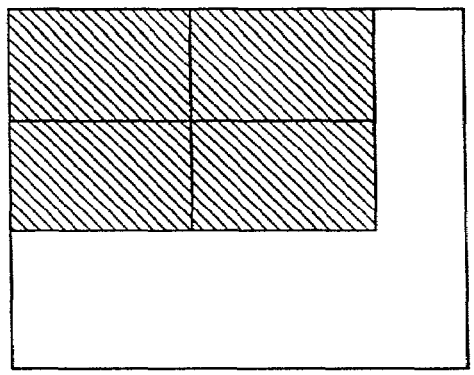
Figure 7:
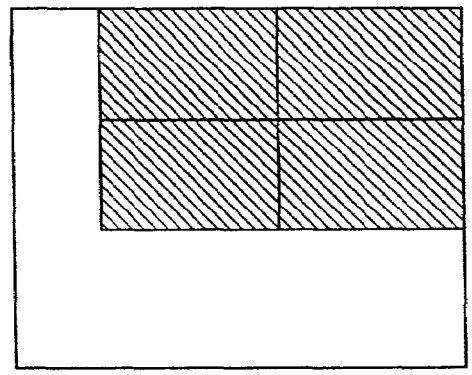
Figure 7:
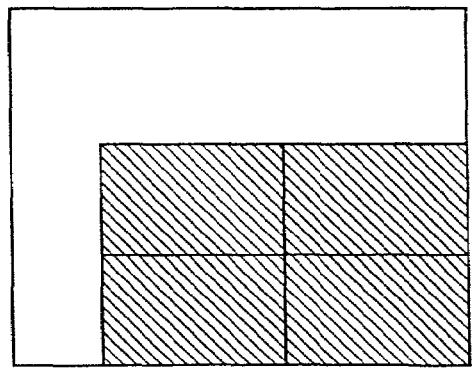
Figure 7:
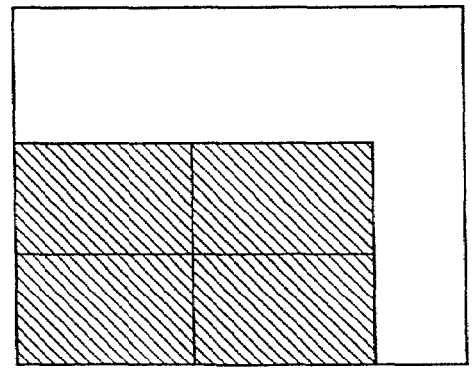

Hereinafter, an information embedding method and an information extracting method according to a second embodiment of the present invention will be described. In the first embodiment of the invention, secret information is embedded in the luminance signal, and information relating to the position where the secret information is embedded (embedding position information) is inserted in the color difference signal. However, both of the secret information and the embedding position information may be inserted in one of the luminance signal and the color difference signal. FIG. 7(a) is a diagram for explaining a first example of multiplexing the embedding position information and the secret information shown by dot-meshing. In this second embodiment, two information embedding methods, which hardly cause visual interference, are prepared as follows, and a screen is spatially divided as shown in FIG. 7(a) for multiplexing.

Embedding method 1:
Employed is an embedding method that is a little resistless to interference due to parallel-translation, but resistant to other interference.

Embedded method 2:
Employed is an embedding method that can take positional synchronization.

As for the embedding method 2, positions where the secret information is to be embedded are specified by using special synchronous patterns which are not generated in other parts of the image, on the basis of positions where the patterns match at a fixed probability. In order to avoid that patterns other than the synchronous patterns are recognized as the synchronous patterns, the synchronous patterns must be sufficiently long, and they must not interfere with the image very much. The above-described M sequences are suitable for the synchronous patterns.

According to the synchronous patterns, there are some cases where synchronization in the horizontal direction is not made. In these cases, the embedding position information may be inserted in the vertical direction as shown in FIG. 7(b).

Figure 4:
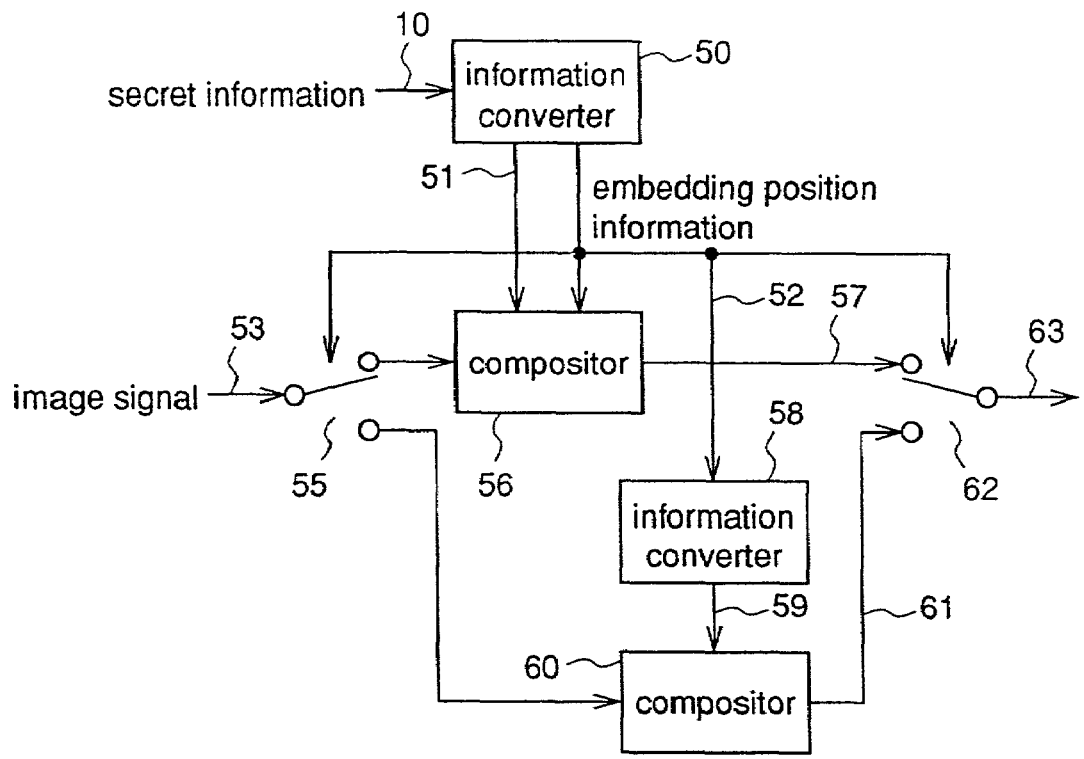
FIGS. 4(a) and 4(b) are block diagrams illustrating an information embedding apparatus and an information extracting apparatus, respectively, according to a second embodiment of the invention.
Figure 4:
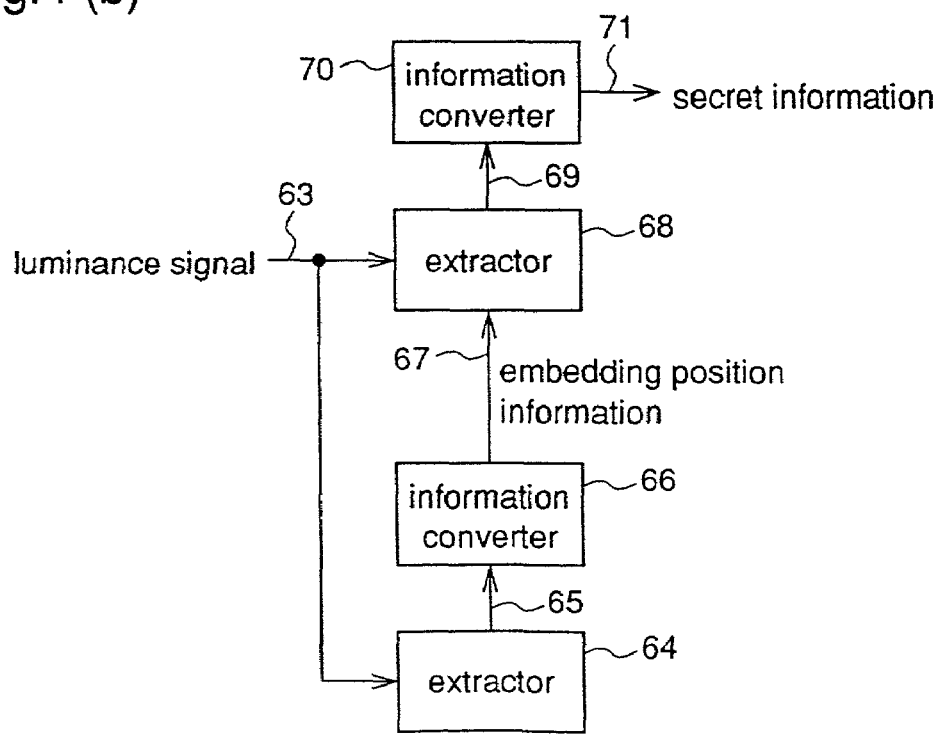

FIG. 4(a) is a block diagram illustrating an information embedding apparatus according to the second embodiment. This apparatus comprises a first information converter 50, a first compositor 56, a second information converter 58, a second compositor 60, a first switch 55, and a second switch 62.

Secret information 10 is input to the information converter 50, and an image signal 53 is input to the switch 55. The information converter 50 converts the secret information 10 to a specific pattern as shown in FIG. 21(b), and further converts the pattern to a secret signal 51 which does not cause visual interference. The secret signal 51 is input to the compositor 56. The information converter 50 generates information 52 showing positions where the secret signal 51 is to be embedded (embedding position information), and outputs the information 52 toward the information converter 58 and the switches 55 and 62.

The switches 55 and 62 are controlled by the embedding position information 52. That is, the switches 55 and 62 are controlled so that the image signal 53 in the position where the secret information is to be embedded is synthesized by the compositor 56 while the image signal 53 in the position where the embedding position information is to be embedded is synthesized by the compositor 60. The compositor 56 multiplexes the secret signal 51 in the positions indicated by the embedding position information 52.

The information converter 58 converts the embedding position information 52 to a secret signal 59. The compositor 60 multiplexes the secret signal 59 in the positions of the image signal 53 where the embedding position information is embedded. The image signal multiplexed by the compositor 56 or 60 is synthesized by the switch 62, and it is output as an image signal 63 for recording or transmission.

FIG. 4(b) is a block diagram illustrating an information extracting apparatus according to the second embodiment. This apparatus comprises a first extractor 64, a first information converter 66, a second extractor 68, and a second information converter 70. The extractor 64 extracts pattern information 65 relating to secret information from the image signal 63, and outputs it toward the information converter 66. The information converter 66 converts the pattern information 65 to embedding position information 67 corresponding to the pattern information 65, and outputs it toward the extractor 68. The extractor 68 extracts pattern information 69 relating to the secret information from positions of the image signal 63 indicated by the embedding position information 67. The information converter 70 converts the pattern information 69 to secret information 71, and outputs the secret information 71.

Figure 5:
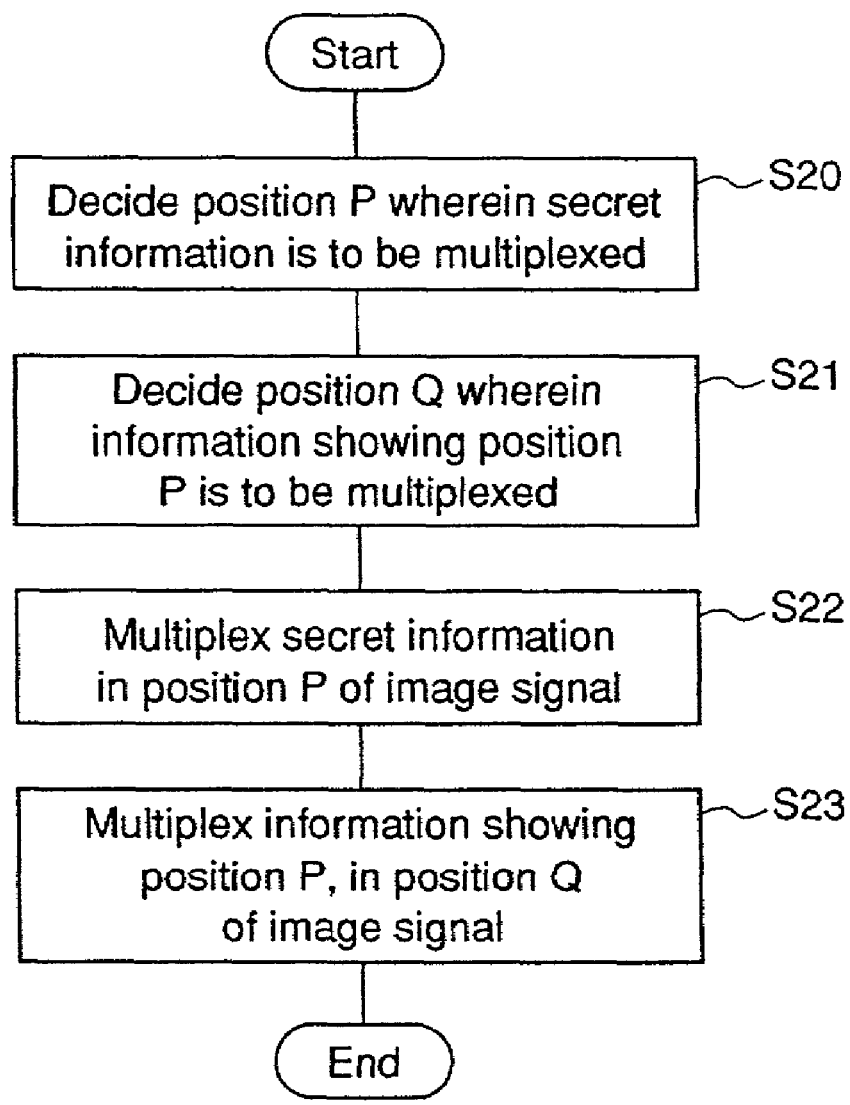
FIG. 5 is a flowchart showing an information embedding method according to the second embodiment.

FIG. 5 is a flowchart showing an information embedding method according to the second embodiment. Initially, in step S20, a position P, where secret information is to be embedded (multiplexed) in an image signal, is decided. Next, in step S21, a position Q, where information showing the position P is to be multiplexed, is decided. In step S22, the secret information is embedded (multiplexed) in the position P of the image signal. In step S23, the information showing the position P is converted to a signal which does not cause visual interference, and the signal is embedded (multiplexed) in the position Q of the image signal.

Figure 6:
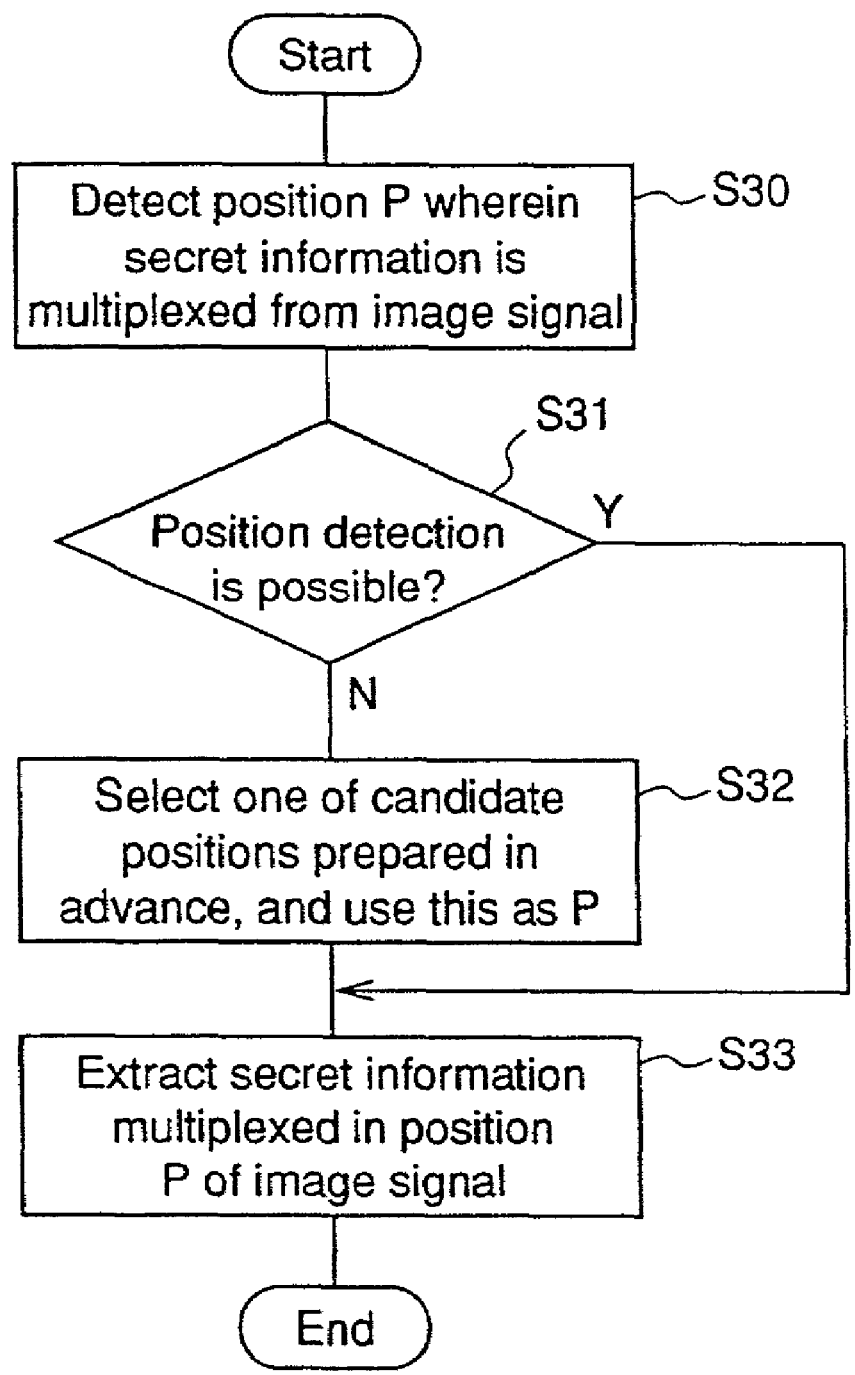
FIG. 6 is a flowchart showing an information extracting method according to the second embodiment.

FIG. 6 is a flowchart showing an information extracting method according to the second embodiment. Initially, in step S30, embedded information is extracted from the image signal, and the position P where the secret information is embedded is detected. In step S31, it is decided whether or not the position P where the secret information is embedded is detected in step S30. When it is not detected, the operation proceeds to step S32 wherein a position is selected by a prescribed method from candidate positions prepared in advance, and the position so selected is regarded as a position P where the secret information is embedded.

Finally, in step S33, the secret information is extracted from the image signal indicated by the extracted position information, and the image signal is decoded. Thereby, correct secret information is extracted. When the position P of the image signal where the secret information is embedded cannot be decoded, it is decided that illegal processing has been carried out, followed by a countermeasure to the illegal processing. Although emphasis has been placed on an image signal in the above description, an audio signal can be processed in similar manner.

Embodiment 3

When an image signal in which secret information is multiplexed is subjected to parallel translation when it is recorded or transmitted, pixel values outside a significant pixel range are lost. If the secret information is multiplexed in the lost pixels, it is difficult to correctly separate the secret information. So, as shown in FIG. 7(c), the position of pixels where the secret information (shown by dot-meshing) is multiplexed is varied frame by frame. In this case, although the secret information cannot be correctly separated in some frames, it can be correctly separated in other frames.

As shown by the (4m+0)th frame to the (4m+3)th frame in FIG. 7(c), when the position where the secret information is multiplexed is varied frame by frame, even if the third party tries to destroy the secret information by intentional interference, the third party cannot easily specify the position where the secret information is multiplexed. In this case, the effect of protecting the secret information is improved.

Further, the position where the secret information is multiplexed may be periodically varied frame by frame. In this case, when the secret information is extracted, it is detected whether the secret information multiplexed position is correctly extracted or not by detecting whether the secret information multiplexed position is periodical frame by frame or not. Further, even when the secret information multiplexed position is not correctly extracted, the secret information multiplexed position in the object frame can be specified from the relationship of the secret information multiplexed positions in the previous and subsequent frames.

When the position of pixels where the secret information is multiplexed is varied frame by frame, the position of pixels is multiplexed to and separated from the image signal by the method described for the first or second embodiment. Although emphasis has been placed on an image signal in the above description, an audio signal may be input and processed in similar manner.

Embodiment 4

Hereinafter, an information embedding method and an information extracting method according to a fourth embodiment of the present invention will be described. As described above, secret information is embedded in an image signal with regard to the characteristic of image so that it hardly causes visual interference. On the other hand, different image signals have different appearances of distortions, according to the contents of the images, for example, an image having many flat portions, an image having many detailed portions, and a moving image. Therefore, within a visually allowable range of degradation, there are two cases where embedding of secret information is possible and where it is not possible.

When it is difficult to embed the secret information, the intensity of embedding the secret information (secret information ratio to image) must be reduced, otherwise degradation of image quality increases. In this case, however, the secret information becomes resistless to illegal destruction. In order to solve this problem, proposed is to embed the secret information by at least two methods. In this case, even though it is difficult to embed the secret information by one method, it can be embedded by the other method. Thereby, the secret information becomes resistant to illegal destruction.

Furthermore, when one of the two pieces of secret information embedded by different methods, i.e., one having less embedding intensity, has been destroyed by illegal alteration, only the other secret information is detected. So, it is decided that illegal destruction of secret information has been carried out. In this case, the manner of handling the secret information is switched, and this effect is posted to the apparatus.

Moreover, since it is difficult to destroy all of the secret information, when no secret information is detected, it is decided that the image does not include secret information originally.

Figure 8:
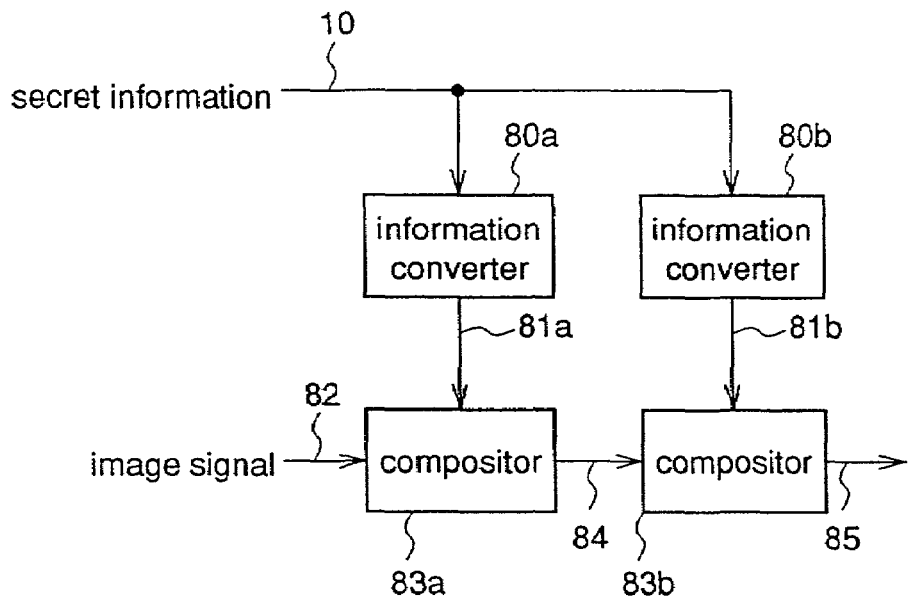
FIGS. 8(a) and 8(b) are block diagrams illustrating an information embedding apparatus and an information extracting apparatus, respectively, according to a fourth embodiment of the invention.
Figure 8:
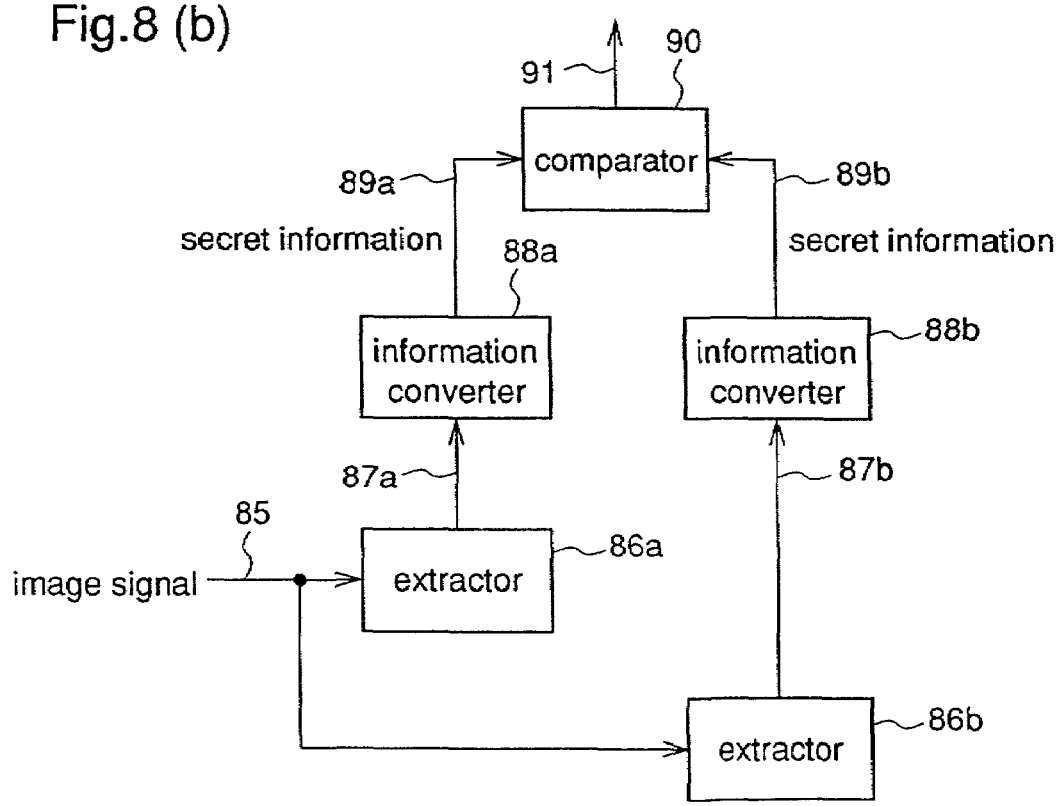

FIG. 8(a) is a block diagram illustrating an information embedding apparatus based on the above-described information embedding methods. This apparatus comprises a first information converter 80a, a second information converter 80b, a first compositor 83a, and a second compositor 83b. The information converter 80a corresponds to the first method of embedding secret information, and the information converter 80b corresponds to the second method of embedding secret information.

Secret information 10 is input to the information converters 80a and 80b, and an image signal 82 is input to the compositor 83a. The information converter 80a converts the secret information 10 to a specific pattern as shown in FIG. 21(b), and converts the pattern to a secret signal 81a which does not cause visual interference, as shown in FIG. 21(c). Likewise, the information converter 80b converts the secret information 10 to a specific pattern, and converts the pattern to a secret signal 81b which does not cause visual interference. The compositor 83a multiplexes the image signal 10 and the secret signal 81a, and outputs a multiplexed signal 84 toward the compositor 83b. The compositor 83b multiplexes the multiplexed signal 84 and the secret signal 81b, and outputs an image signal 85 for recording or transmission.

FIG. 8(b) is a block diagram illustrating an information extracting apparatus according to the fourth embodiment. The apparatus comprises a first extractor 86a, a second extractor 86b, a first information converter 88a, a second information converter 88b, and a comparator 90 serving as information decision means. The extractor 86a extracts first pattern information 87a relating to secret information from the input image signal 85, and the extractor 86b extracts second pattern information 87b relating to secret information from the image signal 85. The information converter 88a converts the pattern information 87a to secret information 89a to be output. Likewise, the information converter 88b converts the pattern information 87b to secret information 89b to be output. The comparator 90 compares these two pieces of secret information to decide whether they are identical or not. When they are identical, the comparator 90 outputs them as proper secret information 91.

Figure 9:
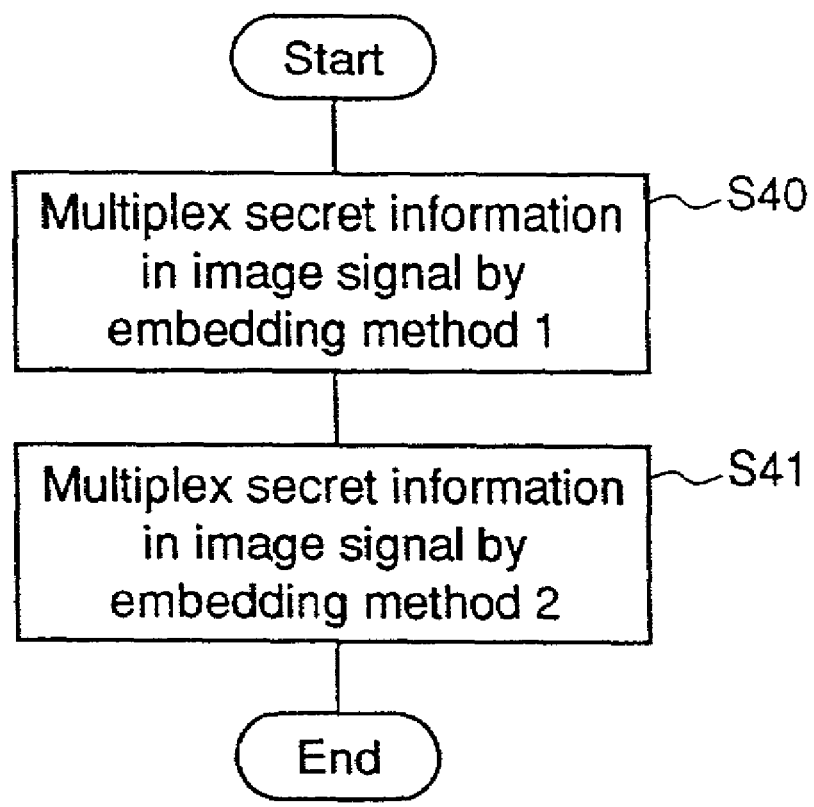
FIG. 9 is a flowchart showing an information embedding method according to the fourth embodiment.

FIG. 9 is a flowchart showing an information embedding method according to this fourth embodiment. Initially, in step S40, input secret information is converted and embedded (multiplexed) in an image signal by the embedding method 1 so that it does not cause visual interference. Next, in step S41, the input secret information is converted and embedded (multiplexed) in the image signal by the embedding method 2 so that it does not cause visual interference.

Figure 10:
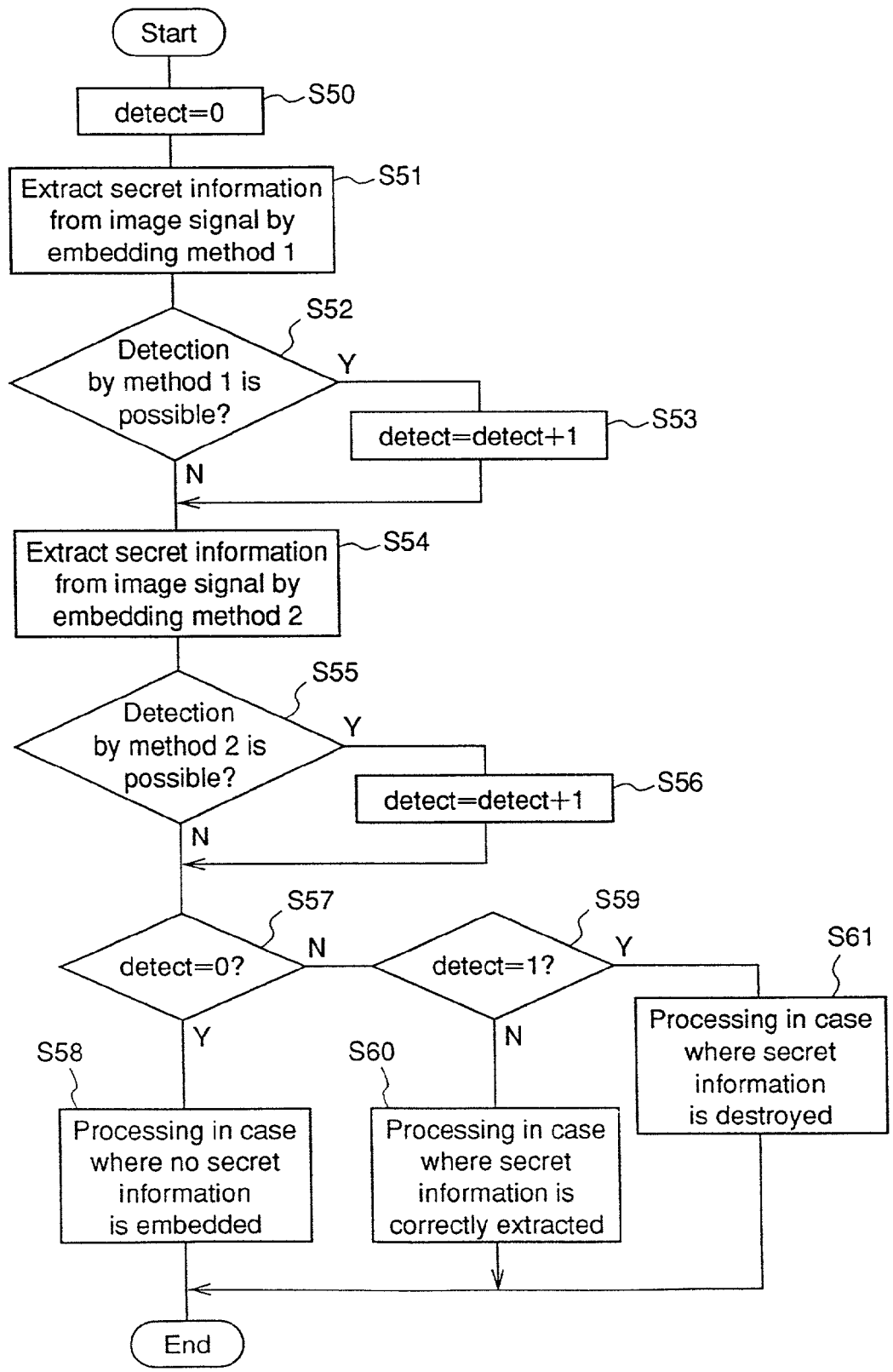
FIG. 10 is a flowchart showing an information extracting method according to the fourth embodiment.

FIG. 10 is a flowchart showing an information extracting method according to this fourth embodiment. In FIG. 10, "detect" is a variable showing the number of secret information extracted. In step S50, initialization is carried out by setting the variable to 0 (detect=0). Next, in step S51, on the assumption that secret information is embedded in an image signal by the embedding method 1, the secret information is extracted by the first method. In step S52, it is detected whether the secret information can be extracted by the embedding method 1 or not. When it is possible, in step S53, 1 is added to the variable (detect=detect+1), followed by step S54. In step S54, on the assumption that secret information is embedded by the embedding method 2, the secret information is extracted from the image signal by the second method. When it can be extracted in step S55, the operation proceeds to step S56 wherein 1 is added to the variable (detect=detect+1).

At this point of time, the value of the variable "detect" shows the number of extracted secret information. When the variable "detect" is 0 in step S57, the operation proceeds to step S58 wherein it is decided that no secret information is embedded, followed by a process for the case where no secret information is embedded. When the variable "detect" is not 0 in step S57, the operation proceeds to step S59 wherein it is detected whether the variable "detect" is 1 or not. When the variable "detect" is 1, the operation proceeds to step S61 wherein it is decided that the secret information is destroyed, followed by a process for the case where the secret information is destroyed. When the variable "detect" is 2 in step S59, the operation proceeds to step S60 wherein it is decided that all of the secret information is correctly extracted, followed by a process for the case where the secret information is correctly extracted.

FIGS. 11(a) and 11(b) are diagrams for explaining examples of decision of secret information, according to the fourth embodiment. These figures show examples for embedding marks showing "non-duplicable" as secret information in an image signal. Since an ordinary image signal does not include secret information, this image signal must be treated as "duplicable". Therefore, as shown in FIG. 11(a), in the case of "duplicable", both the embedding method 1 and the embedding method 2 are given "secret information is absent" (in the figure, "absent"). Conversely, in the case of "non-duplicable", secret information is embedded by the embedding method 1 and the embedding method 2, separately.

As the result, as shown in FIG. 11(b), when both of the two pieces of embedded secret information are not detected (absent) from the image signal, the image signal is "duplicable". When both of the two pieces of embedded secret information are correctly detected (present), the image signal is "non-duplicable", and display of the image signal on a display unit is permitted. Of course, in the case of "non-duplicable", duplication to other recording media is inhibited. On the other hand, when the two pieces of secret information do not match, i.e., when one of them is "present" while the other is "absent", it is decided that the secret information is destroyed, and display of the image signal on the display unit is inhibited. In this way, the information embedding apparatus is provided with a function of preventing the secret information from being illegally destroyed.

While in this fourth embodiment secret information is embedded by two methods, it may be embedded in three or more methods. Further, k pieces of embedding methods (k: natural number) may be arbitrarily selected for each frame from a plurality of embedding methods prescribed, and secret information may be embedded in each frame by the k pieces of methods. Furthermore, although in this fourth embodiment emphasis has been placed on an image signal, an audio signal can be processed in similar manner.

Embodiment 5

Next, an information embedding method and an information extracting method according to a fifth embodiment of the invention will be described. While in the first to fourth embodiments secret information is embedded in a luminance signal or a color difference signal of a color image signal, in this fifth embodiment secret information is embedded in a video signal of CG (Computer Graphics), animation data, MPEG4, or the like. That is, a video signal is composed of a luminance signal (Y), two chrominance signals (U, V), and a shape signal (A), and secret information is written in a specific position in an object corresponding to the video signal.

Figure 13:
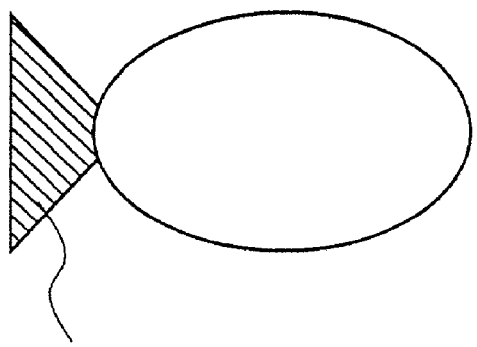
FIGS. 13(a)-13(d) are schematic diagrams for explaining multiplexing of secret information according to a fifth embodiment of the present invention.
Figure 13:
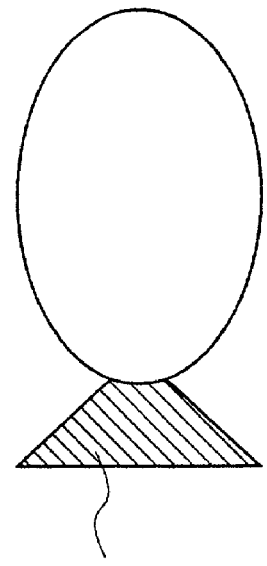
Figure 13:
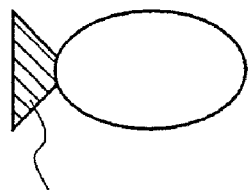
Figure 13:
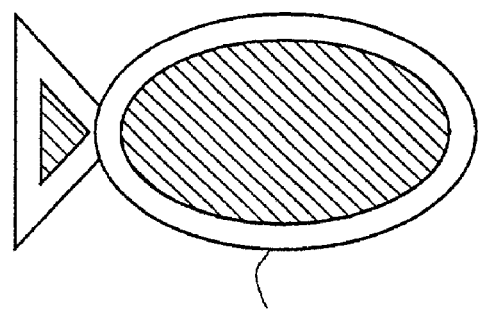

FIG. 13(a) is a schematic diagram showing the case where secret information is recorded in a tail of a fish-shaped object. When secret information is recorded in such a position decided arbitrarily, even though the original image is rotated or reduced as shown in FIGS. 13(b) and 13(c), since the author of the original image already knows the position where the secret information is embedded, the author can easily extract the secret information which is embedded in such a specific position predictable from the shape of the object. When the secret information so extracted is compared with the original image data, it can be decided whether illegal duplication has been done or not.

Figure 14:
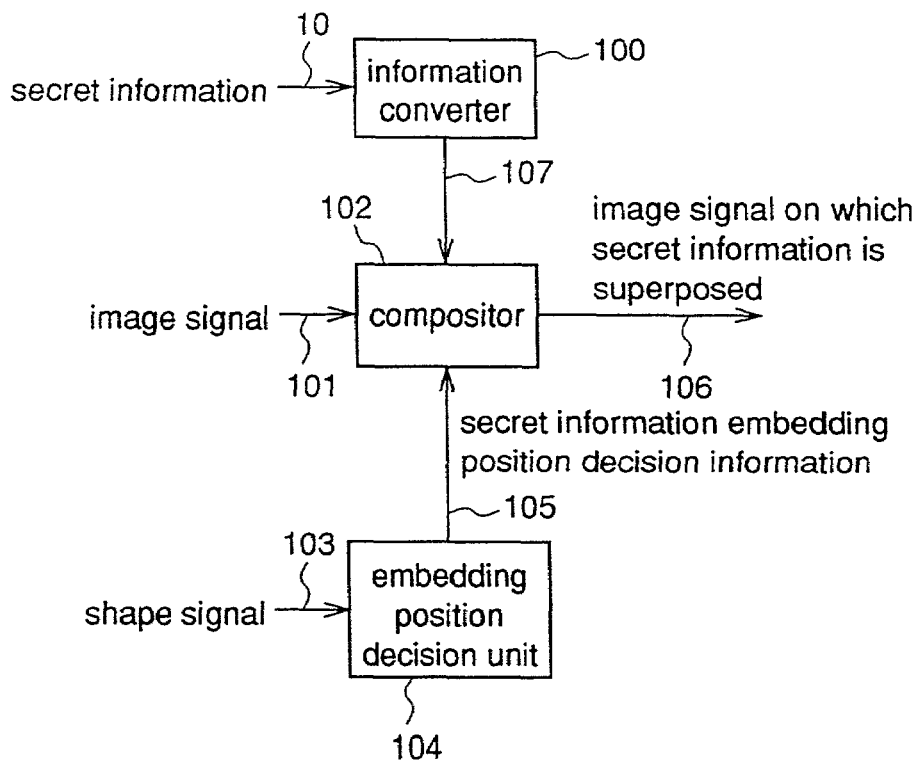
FIG. 14(a) is a block diagram illustrating an information embedding apparatus which performs multiplexing of secret information according to the fifth embodiment.
FIG. 14(b) is a block diagram illustrating an information extracting apparatus which extracts the multiplexed secret information.
Figure 14:
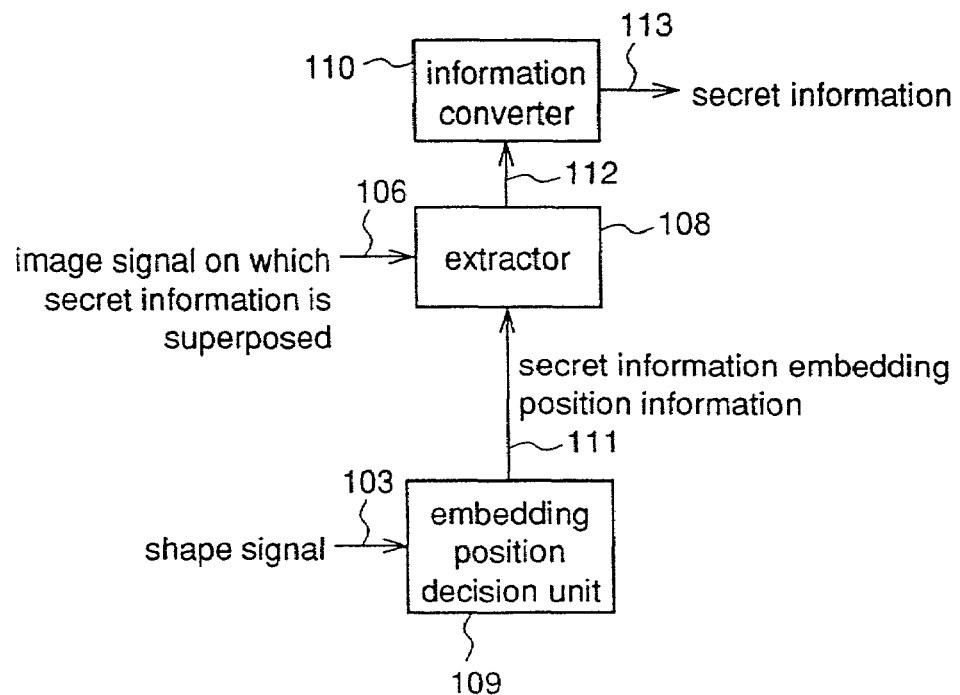

FIG. 14(a) is a block diagram illustrating an information embedding apparatus performing the above-described process of embedding secret information in image data. The information embedding apparatus comprises an information converter 100, a compositor 102, and an embedding position decision unit 104.

A description is now given of the operation of the apparatus. In FIG. 14(a), the information converter 100 converts input secret information 10 to specific pattern information 107 as shown in FIG. 21(b). Further, the embedding position decision unit 104 receives a shape signal 103, and outputs embedding position decision information 105 that indicates where the pattern information 107 obtained by converting the secret information is to be embedded in an image signal 101. The compositor 102 embeds the converted secret information (pattern information) 107 in a prescribed position in the image signal 101 according to the embedding position decision information 105, and outputs the image signal 106 on which the secret information is superposed. To be specific, this compositor 102 is implemented by using a weighting adder or the like, and it performs composition with regard to influences on the image, such as degradation of image quality, when the converted secret information 107 is embedded in the image signal 101.

From the image signal so produced, the secret information is extracted using an information extraction apparatus shown in FIG. 14(b). The information extracting apparatus comprises an information converter 110, an extractor 108, and an embedding position decision unit 109. In FIG. 14(b), the embedding position decision unit 109 extracts information showing the position of the fish tail from the shape signal 108, and outputs this as secret information embedding position information 111 toward the extractor 108. The extractor 108 extracts pattern information 112 from the image signal 106 on which the secret information is superposed, according to the secret information embedding position information 111, and outputs this toward the information converter 110. Then, the information converter 110 converts the pattern information 112 to secret information 113 and outputs the secret information 113.

As described above, according to the fifth embodiment of the invention, a position where the secret information is to be embedded in the image signal 10 is specified by the shape signal showing the shape of the object, and the converted secret information 107 is embedded in the specified position in the image signal 10 by the compositor 102. Therefore, even when the image is rotated by an arbitrary angle, reduced or enlarged, the place where the secret information is embedded can be easily specified from the shape of the object by setting the secret information embedding position as a common convention between the information embedding apparatus and the information extracting apparatus. Therefore, the author of the object (image data) can check whether the image data is his/her work or not.

FIG. 13(d) is a schematic diagram for explaining another example of embedding secret information in a fish-shaped object. In this case, secret information is recorded in a portion of a specific part of the object, for example, in a position that is by k pixels apart from the boundary of the object toward the center of the object. Further, secret information may be embedded in plural positions of one object. When this method, i.e., to embed secret information in a position by k pixels inside the boundary of the object, is set as a common convention between the information embedding apparatus and the information extracting apparatus, the secret information embedding position can be detected more easily. Therefore, the copyright holder can check the secret information. Further, when the third party who does not have the copyright reproduces or duplicates the data, it is decided by the reproduction unit whether the data is to be displayed for the third party or reproduction of the data is to be stopped.

Embodiment 6

Hereinafter, an information embedding method and an information extracting method according to a sixth embodiment of the present invention will be described. In this sixth embodiment, a direction along which secret information is embedded in an object is specified.

Figure 15:
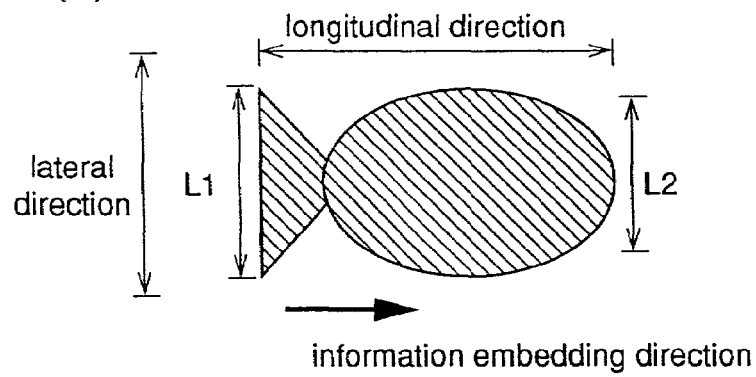
FIGS. 15(a)-15(d) are schematic diagrams for explaining multiplexing of secret information according to a sixth embodiment of the invention.
Figure 15:
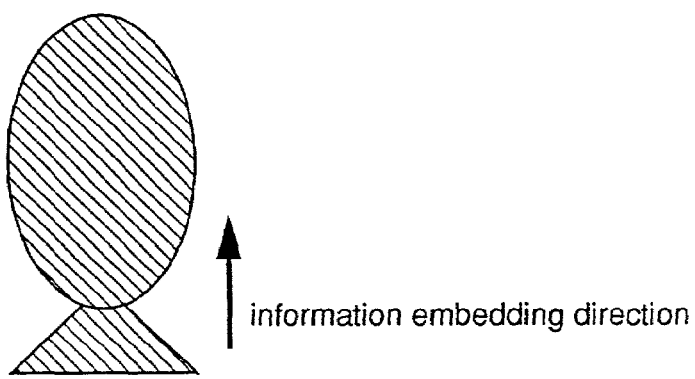
Figure 15:
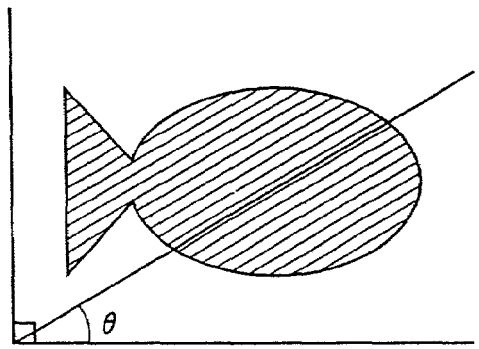
Figure 15:
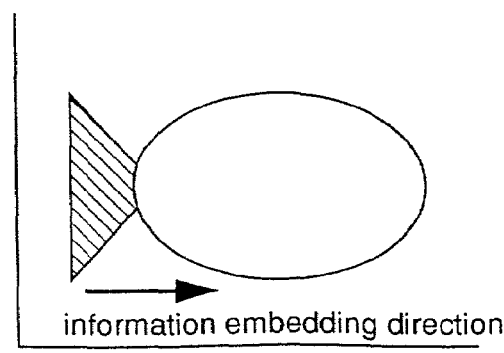

FIG. 15(a) is a schematic diagram for explaining an order for embedding secret information over a fish-shaped object. As shown in FIG. 15(a), secret information is embedded along the longitudinal direction of the fish (horizontal direction). Or, on the basis of the size of the object in the lateral direction, i.e., the relationship of L1>L2 when the width of the tail L1 (vertical direction) is compared with the width of the head L2 (vertical direction), secret information is embedded in the direction from the tail of larger width (L1) toward the head of smaller width (L2). Since the secret information embedding direction is defined as described above, even when the object is rotated by an arbitrary angle, for example, about 90° as shown in FIG. 15(b), the secret information embedding direction can be specified when the secret information is extracted from the object.

Figure 16:
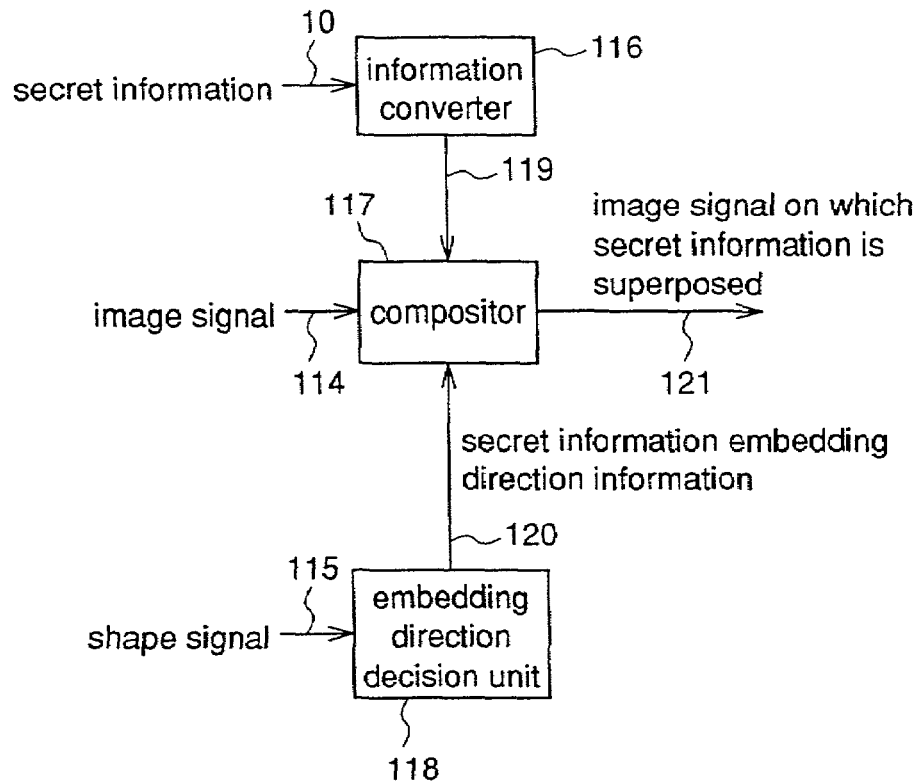
FIG. 16(a) is a block diagram illustrating an information embedding apparatus which performs multiplexing of secret information according to the sixth embodiment.
FIG. 16(b) is a block diagram illustrating an information extracting apparatus which extracts the multiplexed secret information.
Figure 16:
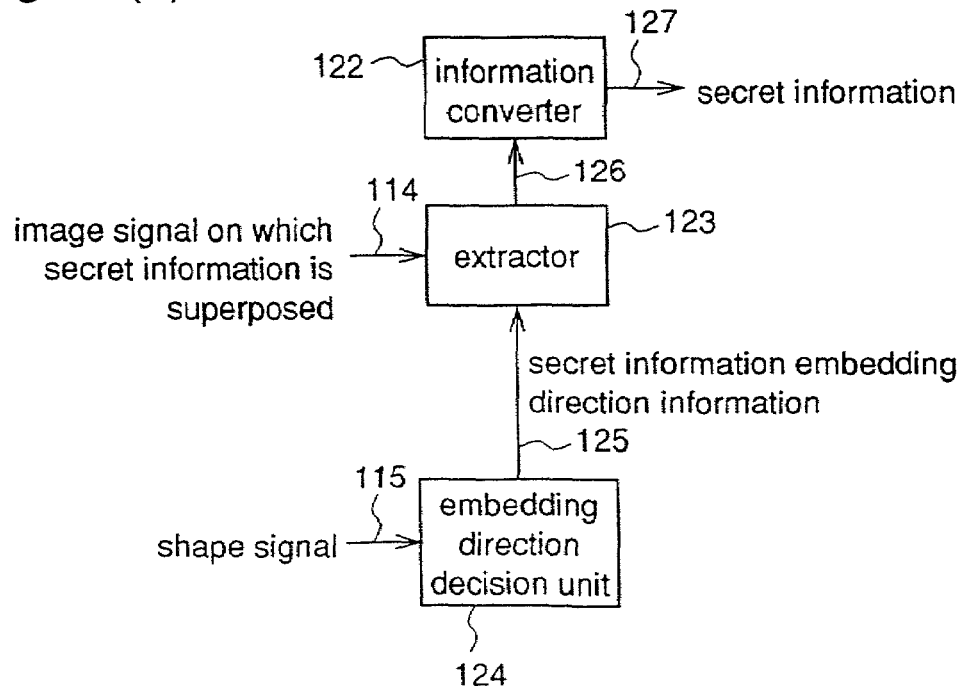

FIG. 16(a) is a block diagram illustrating an information embedding apparatus performing the above-described process of embedding secret information in image data. This information embedding apparatus comprises an information converter 116, a compositor 117, and an embedding direction decision unit 118.

A description is given of the operation of the apparatus. The information converter 116 converts input secret information 10 to specific pattern information 119 shown in FIG. 21(b). The embedding direction decision unit 118 receives a shape signal 115, and outputs embedding direction decision information 120 that indicates a direction along which the pattern information 119 obtained by converting the secret information 10 is to be embedded in an image signal 114. The compositor 117 embeds the converted secret information 119 in a prescribed direction according to the embedding direction decision information 120, and outputs the image signal 121 on which the secret information is superposed. To be specific, this compositor 117 is implemented by using a weighting adder or the like.

From the image signal so produced, the secret information is extracted using an information extraction apparatus shown in FIG. 16(b). The information extracting apparatus comprises an information converter 122, an extractor 123, and an embedding direction decision unit 124. In FIG. 16(b), the embedding direction decision unit 124 extracts information showing the direction along which the secret information has been embedded, from the shape signal 115, and outputs it as secret information embedding direction information 125 toward the extractor 123. The extractor 123 extracts pattern information 126 from the image signal 114 on which the secret information is superposed, according to the secret information embedding direction information 125, and outputs this toward the information converter 122. Then, the information converter 122 converts the pattern information 126 to secret information 127 and outputs the secret information 127.

As described above, according to the sixth embodiment of the present invention, the direction along which the secretion information 10 is to be embedded in the object is specified according to the shape signal showing the shape of the object, and the converted secret information 119 is embedded in the image signal 114 along the specified direction by the compositor 117. Therefore, even when the image is rotated slightly, scanning is accurately carried out when reading the image. Further, by setting the secret information embedding direction as a common convention between the information embedding apparatus and the information extracting apparatus, the direction along which the secret information is embedded can be easily specified from the shape of the object. Accordingly, even though the image is slightly rotated when it is duplicated using an analog device of which precision is not very high, the secret information can be easily extracted.

In this sixth embodiment, the object is regarded as a rectangle, and secret information is embedded along the longer side of the object or the shorter size of the object as shown in FIG. 15(a), secret information may be embedded along a direction having a prescribed angle θ with respect to the longer side of the object as shown in FIG. 15(c).

Further, while in this sixth embodiment secret information is embedded over the object, secret information may be embedded in a prescribed portion of the object, along a prescribed direction, as shown in FIG. 15(d). That is, this sixth embodiment may be combined with the fifth embodiment.

Embodiment 7

Next, an information embedding method and an information extracting method according to a seventh embodiment of the present invention will be described. In this seventh embodiment, when secret information is embedded in an object, the amount of secret information to be embedded is varied according to the size of the object.

Figure 17:
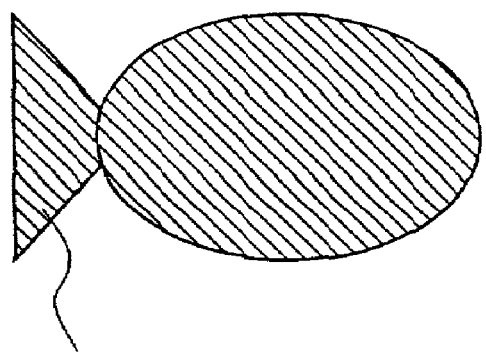
FIGS. 17(a) and 17(b) are schematic diagrams for explaining multiplexing of secret information according to a seventh embodiment of the invention.
Figure 17:
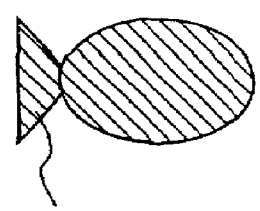

As described above, secret information is embedded in an image signal with regard to the characteristic of each image so that the secret information hardly causes visual interference. However, if a large amount of secret information is embedded in a small object, the secret information adversely affects the image to some extent, for example, the image quality is degraded. So, in this seventh embodiment of the invention, when secret information is recorded in a relatively large fish-shaped object and a relative small fish-shaped object as shown in FIGS. 17(a) and 17(b), respectively, a relatively large amount of secret information is embedded in the large object while a relatively small amount of secret information is embedded in the small object.

Figure 18:
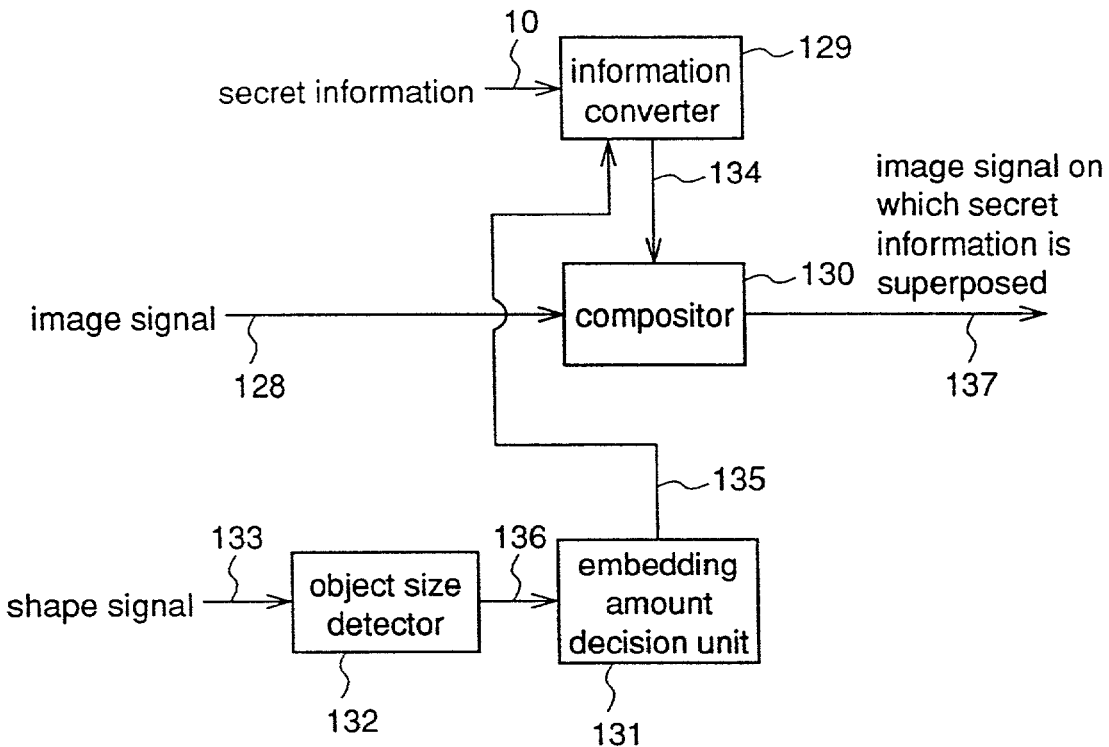
FIG. 18(a) is a block diagram illustrating an information embedding apparatus which performs multiplexing of secret information according to the seventh embodiment.
FIG. 18(b) is a block diagram illustrating an information extracting apparatus which extracts the multiplexed secret information.
Figure 18:
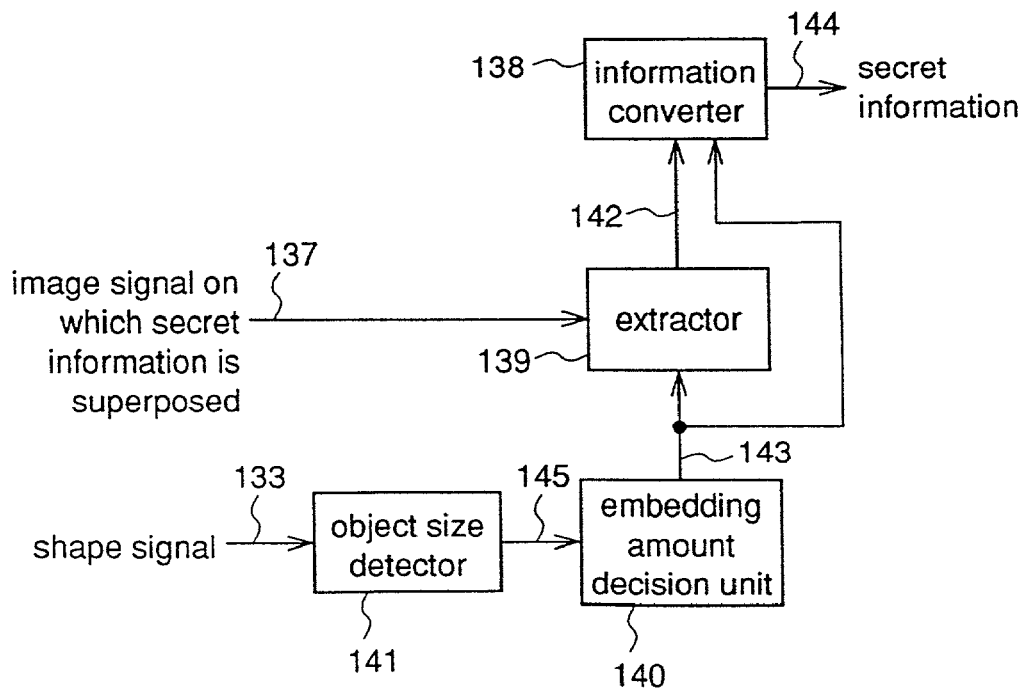

FIG. 18(a) is a block diagram illustrating an information embedding apparatus performing the above-described process of embedding secret information in image data. This information embedding apparatus comprises an information converter 129, a compositor 130, an embedding amount decision unit 131, and an object size detector 132.

A description is given of the operation of the apparatus. The object size detector 132 receives a shape signal 133, recognizes the size of the object, and outputs size information 136. The embedding amount decision unit 131 receives the size information 136, and supplies the information converter 129 with secret information converting amount information 135 for controlling the amount of secret information 10 to be converted by the information converter 129. The information converter 129 converts the secret information by an amount based on the secret information converting amount information 135, to specific pattern information 134 as shown in FIG. 21(b). At this time, the converted pattern, for example, the cycle of pseudo random numbers, varies according to the converted amount. Further, the amount of secret information to be converted according to the secret information converting amount information 135 may be set so that it changes linearly or stepwise.

The compositor 130 embeds the converted secret information 134 in the image signal 128, and outputs the image signal 137 on which the secret information is superposed. To be specific, this compositor 130 is implemented by using a weighting adder or the like.

From the image signal so produced, the secret information is extracted using an information extraction apparatus shown in FIG. 18(b). The information extracting apparatus comprises an information converter 138, an extractor 139, an embedding amount decision unit 140, and an object size detector 141. In FIG. 18(b), the object size detector 141 detects the size of the object from the shape signal 133, and outputs it toward the embedding amount decision unit 140. The embedding amount decision unit 140 outputs secret information conversion information 143 toward the extractor 139 and the information converter 138. The secret information conversion information 143 shows an embedding pattern for extracting the secret information in the extractor 139, and an information conversion method for converting the pattern information 142 to the secret information 144 in the information converter 138. According to the secret information conversion information 143, the extractor 139 extracts the pattern information 142, by a prescribed method, from the image signal 137 on which the secret information is superposed, and outputs this toward the information converter 138. The information converter 138 converts the pattern information 142 to the secret information 144 according to the information conversion method shown by the secret information conversion information 143, and outputs the secret information 144.

As described above, according to the seventh embodiment of the present invention, when the secret information 10 is embedded in the object according to the shape signal showing the shape of the object, the amount of secret information to be embedded is varied according to the size of the object. To be specific, the secret information 10 is converted into the secret information 134 of a prescribed amount by a prescribed method according to the size of the image signal 128, and the secret information 134 is embedded in the image signal 128 by the compositor 130. Therefore, regardless of the image size, the amount of embedded secret information per pixel is made uniform, whereby degradation of image quality due to secret information is avoided.

While in this seventh embodiment secret information is embedded over the object, secret information may be embedded in a prescribed portion of the object. That is, this seventh embodiment may be combined with the fifth embodiment.

Furthermore, it is also possible to specify the direction along which secret information is embedded in the object, i.e., this seventh embodiment may be combined with the sixth embodiment.

Embodiment 8

Figure 19:
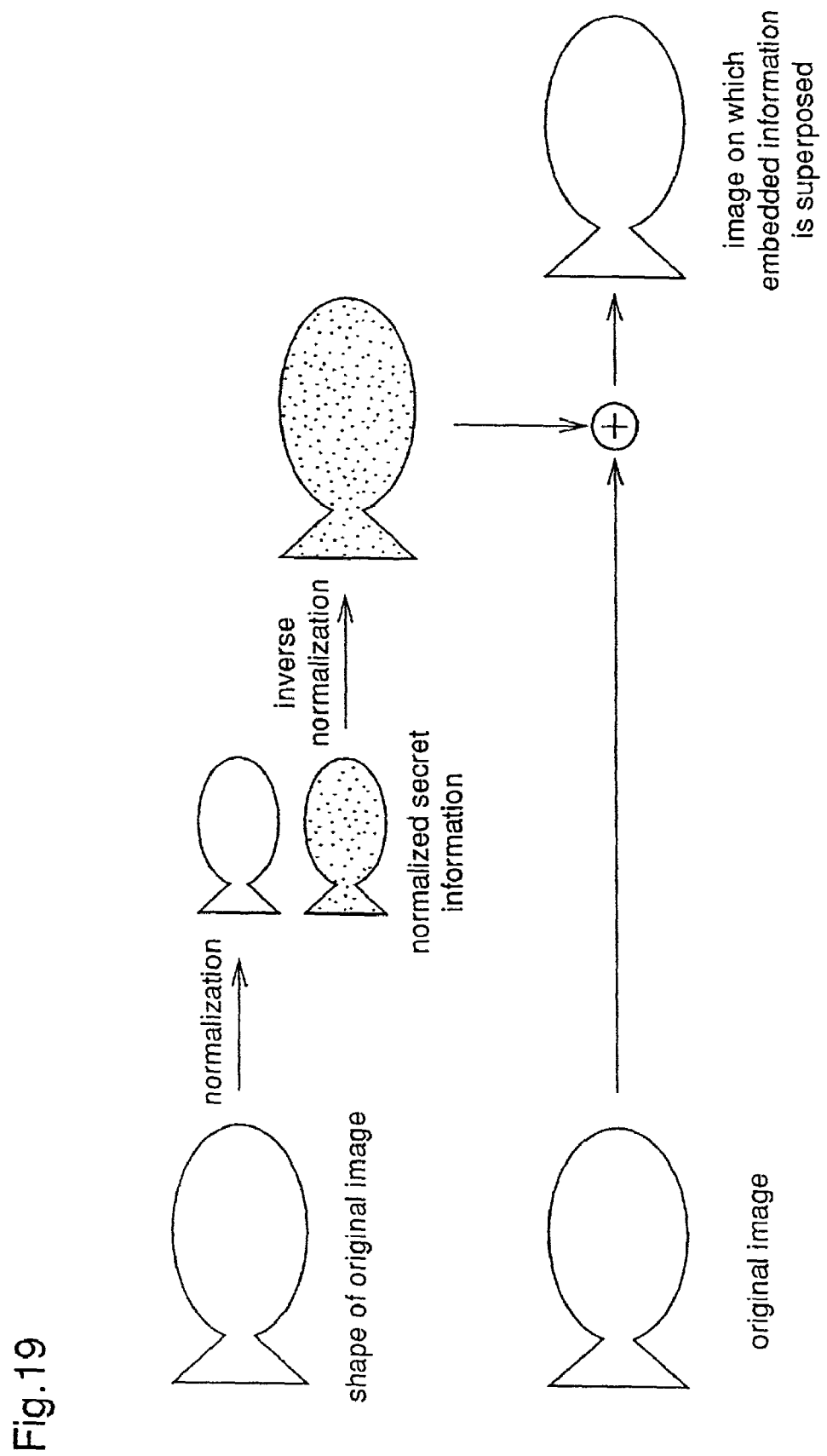
FIG. 19 is a schematic diagram for explaining multiplexing of secret information according to an eighth embodiment of the invention.

Next, an information embedding method and an information extracting method according to an eighth embodiment of the present invention will be described. In this eighth embodiment, when secret information is embedded, as shown in FIG. 19, a frame for secret information is created by reducing or enlarging the size of an original object (in this embodiment, it is reduced), and secret information is formed according to the size of this frame. The secret information and the original object are composited after converting (inverse normalization) the frame to the original size, i.e., the size of the original object.

Figure 20:
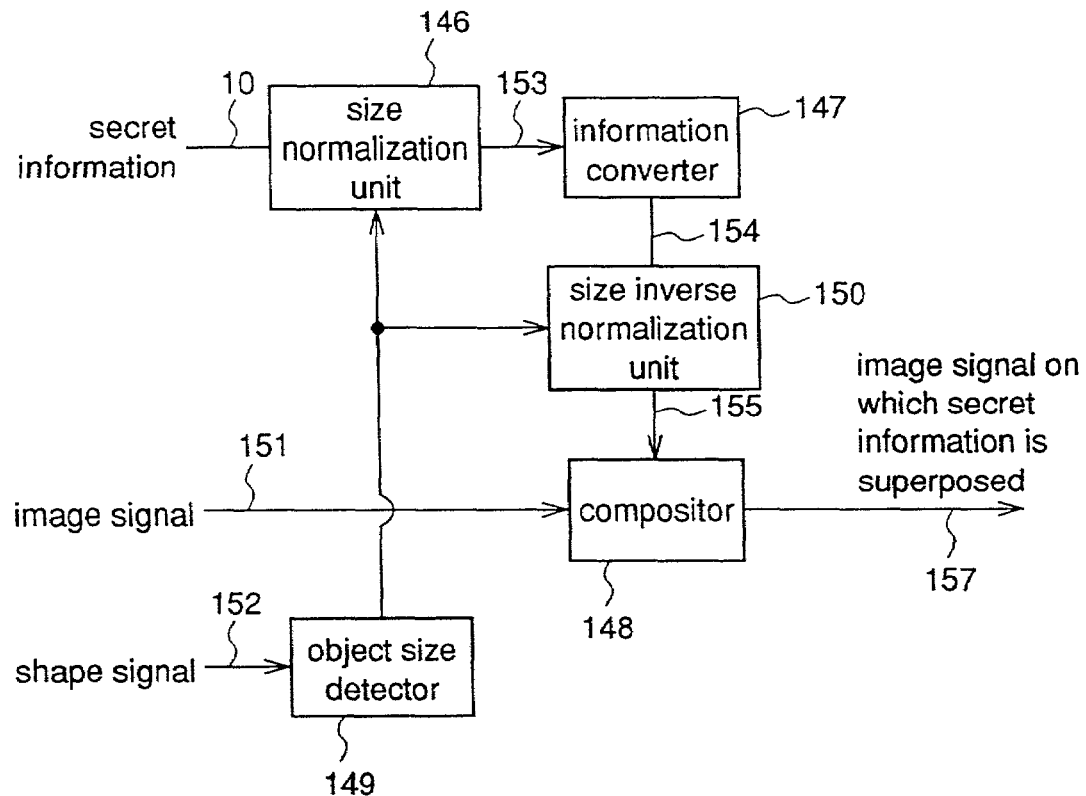
FIG. 20(a) is a block diagram illustrating an information embedding apparatus which performs multiplexing of secret information according to the eighth embodiment.
FIG. 20(b) is a block diagram illustrating an information extracting apparatus which extracts the multiplexed secret information.
Figure 20:
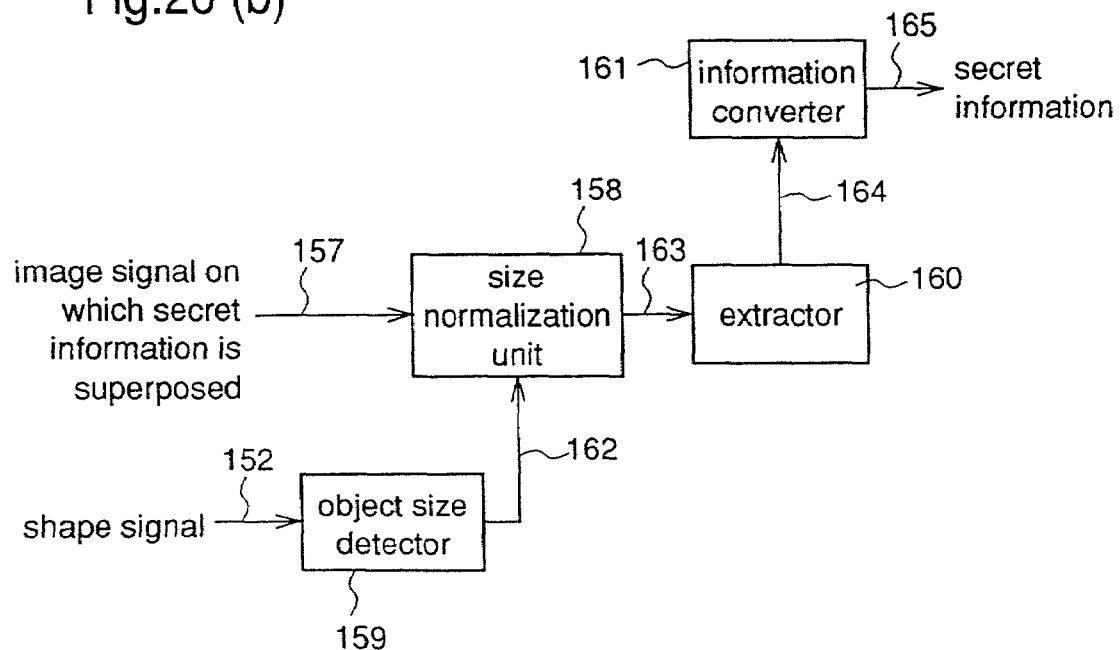

FIG. 20(a) is a block diagram illustrating an information embedding apparatus performing the above-described process of embedding secret information in image data. This apparatus comprises a size normalization unit 146, an information converter 147, a compositor 148, an object size detector 149, and a size inverse normalization unit 150.

A description is given of the operation of the apparatus. In FIG. 20(a), the object size detector 149 receives a shape signal 152, recognizes the size of the object, and outputs size information 156. According to the size information 156, the size normalization unit 146 creates a frame for secret information by reducing (or enlarging) the size of the object included in the image signal 151 to a prescribed size, and embeds secret information in this frame to normalize the secret information. The normalized secret information 153 is input to the information converter 147, wherein it is converted to specific pattern information 154 as shown in FIG. 21(b).

The normalized secret information (pattern information) 154 is inversely normalized by the size inverse normalization unit 150, whereby it is converted to secret information 155 having the original size (the size of the original object) and the original shape. At this time, the size inverse normalization unit 150 performs inverse normalization while referring to the size information 156 output from the object size detector 149. The inversely-normalized secret information 155 is input to the compositor 148.

The compositor 148 embeds the secret information 155 in the image signal 151, and outputs the image signal 157 on which the secret information is superposed. This compositor 148 is implemented by using a weighting adder or the like.

From the image signal so produced, the secret information is extracted using an information extracting apparatus as shown in FIG. 20(b). This apparatus comprises a size normalization unit 158, an object size detector 159, an extractor 160, and an information converter 161.

In FIG. 20(b), the object size detector 159 detects the size of the object from the shape signal 152, and outputs size information 162 toward the size normalization unit 158. The size normalization unit 158 enlarges (or reduces) the size of the image signal 157 on which the secret information is superposed to a prescribed size, with reference to the size information 162, thereby to normalize the image signal. Then, the normalization unit 158 outputs the normalized image signal 163 toward the extractor 160. As the size of the object is restored to the original size, the size of the secret information is automatically restored to the original size. The extractor 160 extracts pattern information 164 from the normalized image signal 163 on which the secret information is superposed, and outputs this toward the information converter 161. The information converter 161 converts the pattern information 164 to secret information 165.

As described above, according to the eighth embodiment of the present invention, when the secret information 10 is embedded in the object according to the shape signal showing the shape of the object, the secret information frame is created by reducing or enlarging the secret information to a prescribed size relative to the size of the object, and the secret information 10 is formed according to this frame and, after restoring the size of the secret information 10 to the original size, the secret information 10 and the image data 151 are composited. Therefore, even when the image is compressed or expanded, since the secret information is read after restoring the size of the image including the secret information to its size at normalization, the secret information is read with high reliability.

In this eighth embodiment, secret information is formed in a shape smaller than the object and, thereafter, it is restored to the original size when being composited with the image signal. However, secret information may be formed in a shape larger than the object and, also in this case, it is restored to the original size when being composited with the image signal.

Embodiment 9

In a ninth embodiment of the invention, a program for implementing an information embedding method and an information extracting method according to any of the aforementioned embodiments is recorded in a recording medium such as a floppy disk. Thus, processing shown by any of the aforementioned embodiments can be easily executed in an independent computer system.

Figure 12:
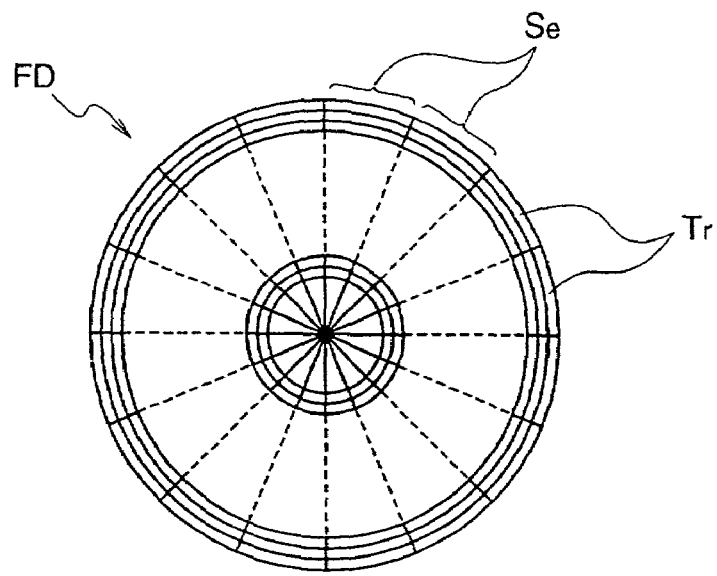
FIGS. 12(a)-12(c) are diagrams for explaining how to implement an information embedding method and an information extracting method by using a computer system.
Figure 12:
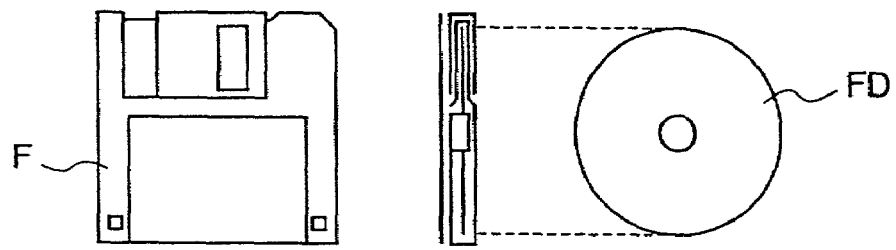
Figure 12:
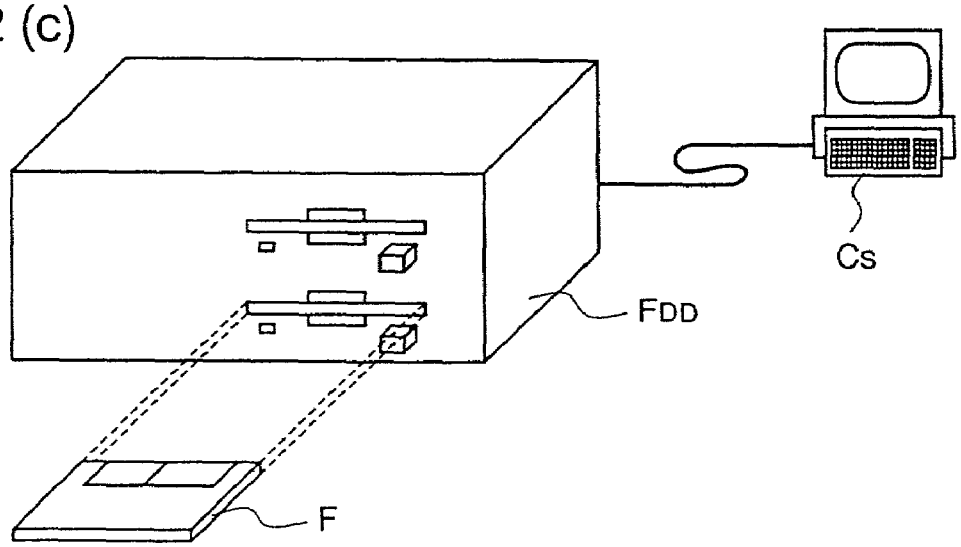

FIGS. 12(a)-12(c) are diagrams for explaining a floppy disk containing a program for a coding apparatus including any of the above-mentioned information embedding methods and for a decoding apparatus including an information extracting method corresponding to the embedding method, and a computer system for executing information embedding and information extraction using the floppy disk. More specifically, FIG. 12(a) shows an example of a physical format of the floppy disk, i.e., a recording medium body, and FIG. 12(b) shows a front view of the floppy disk, a cross-sectional structure, and a disk case.

The floppy disk (FD) is contained in the case F. On the surface of the disk, a plurality of tracks Tr are formed concentrically from the outer circumference of the disk toward the inner circumference. Each track is divided into 16 sectors (Se) in the angular direction. Therefore, in the floppy disk containing the above-mentioned program, the program is recorded on an assigned region.

FIG. 12(c) shows a system for recording/reproducing the program in/from the floppy disk FD. When the program is recorded in the floppy disk FD, the program is written in the floppy disk FD from the computer system Cs through the floppy disk drive FDD. When a coding apparatus or a decoding apparatus is constructed in the computer system Cs according to the program recorded in the floppy disk FD, the program is read from the floppy disk FD by the floppy disk drive FDD, and transferred to the computer system Cs.

While in this ninth embodiment a floppy disk is employed as a recording medium, an optical disk may be employed in similar way. Further, applicable recording media are not restricted thereto, namely, any recording media may be employed as long as the above-described program can be recorded therein, for example, an IC card and a ROM cassette.

What is claimed is:

1. A method for embedding secret information in a color image signal, comprising:
   embedding said secret information in a prescribed position in a first signal component of a color image signal; and
   embedding position information, which specifies the position where the secret information is embedded, in a second signal component of said color image signal, wherein said color image signal comprises a plurality of color components, and said second signal component is a different color component from said first signal component.

2. The method for extracting secret information from a color image signal in which said secret information is embedded by an information embedding method according to claim 1, comprising:
   extracting said position information from said second signal component of said color image signal; and
   based on at least the position information extracted, extracting said secret information from said first signal component of said color image signal.

3. The computer-readable medium in which a program for executing an information extracting method according to claim 2 is recorded.

4. The method according to claim 1, wherein the position where said secret information is to be embedded is varied frame by frame.

5. The method according to claim 4, wherein when said secret information is extracted from said image signal, the position from which said secret information is extracted is varied frame by frame.

6. The computer-readable medium in which a program for executing an information embedding method according to claim 1 is recorded.

7. A method for embedding secret information in a color image signal, comprising:
   embedding said secret information in a prescribed position in a luminance signal of said color image signal; and
   embedding position information, which specifies the position where the secret information is embedded, in a color difference signal of said color image signal.

8. The method for extracting secret information from a color image signal in which said secret information is embedded by an information embedding method according to claim 7, comprising:
   extracting said position information from said color difference signal of said color image signal; and
   based on at least the position information extracted, extracting said secret information from said luminance signal of said color image signal.

9. An apparatus for embedding secret information in a color image signal, comprising:
   first information embedding means for embedding said secret information in a prescribed position in a first signal component of said color image signal; and
   second information embedding means for embedding position information, which specifies the position where the secret information is embedded, in a second signal component of said color image signal.

10. The apparatus according to claim 9, further comprising:
    first information extracting means for extracting said position information from said second signal component of said color image signal; and
    second information extracting means for extracting said secret information from said first signal component of said color image signal, based on at least the position information provided by the first information extracting means.

* * * * *